(12) United States Patent
Kanao et al.

(10) Patent No.: US 11,170,069 B2
(45) Date of Patent: Nov. 9, 2021

(54) CALCULATING DEVICE, CALCULATION PROGRAM, RECORDING MEDIUM, AND CALCULATION METHOD

(71) Applicant: KABUSHIKI KAISHA TOSHIBA, Tokyo (JP)

(72) Inventors: Taro Kanao, Kanagawa (JP); Hayato Goto, Kanagawa (JP); Kosuke Tatsumura, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 184 days.

(21) Appl. No.: 16/299,625

(22) Filed: Mar. 12, 2019

(65) Prior Publication Data

US 2020/0089727 A1    Mar. 19, 2020

(30) Foreign Application Priority Data

Sep. 14, 2018    (JP) .............................. JP2018-172354

(51) Int. Cl.
  *G06F 17/10*    (2006.01)
  *G06F 17/13*    (2006.01)

(52) U.S. Cl.
  CPC .............. *G06F 17/10* (2013.01); *G06F 17/13* (2013.01)

(58) Field of Classification Search
  CPC ......................... G06F 17/13; G06F 17/10–13
  See application file for complete search history.

(56) References Cited

U.S. PATENT DOCUMENTS

2004/0015459 A1    1/2004  Jaeger
2019/0266212 A1*   8/2019  Goto ..................... G06F 17/11
(Continued)

FOREIGN PATENT DOCUMENTS

JP    4093858 B2    6/2008
JP    2017-2705 A   1/2017

OTHER PUBLICATIONS

Lukoševičius, Mantas, and Herbert Jaeger. "Reservoir Computing Approaches to Recurrent Neural Network Training." Computer Science Review, Elsevier, May 13, 2009, www.sciencedirect.com/science/article/pii/S1574013709000173. (Year: 2009).*

(Continued)

*Primary Examiner* — Aimee Li
*Assistant Examiner* — Huy Duong
(74) *Attorney, Agent, or Firm* — Finnegan, Henderson, Farabow, Garrett & Dunner L.L.P.

(57) ABSTRACT

According to one embodiment, a calculating device includes a processor. The processor acquires a data set {s} and repeats a processing procedure. The processing procedure includes first and second variable updates. The first variable update includes updating an ith entry of a first variable $x_i$ by adding a first function to the ith entry of the first variable $x_i$. The ith entry of the first variable $x_i$ is one of a first variable set {x}. A variable of the first function includes at least a part of a second variable set {y}. The second variable update includes updating an ith entry of a second variable $y_i$ by adding a second function and a third function to the ith entry of the second variable $y_i$. The ith entry of the second variable $y_i$ is one of the second variable set {y}. The processor outputs at least a fourth function.

15 Claims, 14 Drawing Sheets

(56) References Cited

U.S. PATENT DOCUMENTS

2020/0089473 A1* 3/2020 Goto ............... G06F 7/552
2020/0090066 A1* 3/2020 Kanao ............. G06F 17/18

OTHER PUBLICATIONS

H. Mori and S. Suga, "Power system harmonics prediction with an artificial neural network," 1991., IEEE International Sympoisum on Circuits and Systems, Singapore, 1991, pp. 1129-1132 vol. 2, doi: 10.1109/ISCAS.1991.176565. (Year: 1991).*

Schrauwen, B., et al. "[PDF] An Overview of Reservoir Computing: Theory, Applications and Implementations: Semantic Scholar." Undefined, Jan. 1, 1970, www.semanticscholar.org/paper/An-overview-of-reservoir-computing:-theory,-and-Schrauwen-Verstraeten/deca892f96097588c88ac70b332baaa323a7df72. (Year: 1970).*

Goto, Hayato, et al. "Combinatorial Optimization by Simulating Adiabatic Bifurcations in Nonlinear Hamiltonian Systems." Science Advances, American Association for the Advancement of Science, Apr. 1, 2019, advances.sciencemag.org/content/5/4/eaav2372. (Year: 2019).*

K. Tatsumura, A. R. Dixon and H. Goto, "FPGA-Based Simulated Bifurcation Machine," 2019 29th International Conference on Field Programmable Logic and Applications (FPL), Barcelona, Spain, 2019, pp. 59-66, doi: 10.1109/FPL.2019.00019. (Year: 2019).*

Goto, Hayato, and Zhirong Lin. "Dissipative Quantum Bifurcation Machine: Quantum Heating of Coupled Nonlinear Oscillators." Researchgate.net, 2017, www.researchgate.net/publication/318205088_Dissipative_quantum_bifurcation_machine_Quantum_heating_of_coupled_nonlinear_oscillators. (Year: 2017).*

H. Jaeger et al., "Harnessing Nonlinearity: Predicting Chaotic Systems and Saving Energy in Wireless Communication," Science, vol. 304, pp. 78-80 (Apr. 2, 2004).

W. Maass et al., "Real-Time Computing Without Stable States: A New Framework for Neural Computation Based on Perturbations," Neural Computation, vol. 14, pp. 2531-2560 (2002).

H. Goto, "Bifucation-based adiabatic quantum computation with a nonlinear oscillator network," Scientific Reports, 6:21686, pp. 1-8 (Feb. 22, 2016).

K. Fujii et al., "Harnessing Disordered-Ensemble Quantum Dynamics for Machine Learning," Physical Review Applied 8:024030, pp. 1-20 (2017).

L. Appeltant et al., "Information processing using a single dynamical node as complex system," Nature Communications, 2:468, pp. 1-6 (2011).

D. Brunner et al., "Parallel photonic information processing at gigabyte per second data rates using transient states," Nature Communication, 4:1364, pp. 1-7 (2013).

J. Torrejon et al. "Neuromorphic computing with nanoscale spintronic oscillators," Nature, vol. 547, pp. 428-432 (Jul. 27, 2017).

* cited by examiner

US 11,170,069 B2

CALCULATING DEVICE, CALCULATION PROGRAM, RECORDING MEDIUM, AND CALCULATION METHOD

CROSS-REFERENCE TO RELATED APPLICATIONS

This application is based upon and claims the benefit of priority from Japanese Patent Application No. 2018-172354, filed on Sep. 14, 2018; the entire contents of which are incorporated herein by reference.

FIELD

Embodiments described herein relate generally to a calculation device, a calculation program, a recording medium, and a calculation method.

BACKGROUND

For example, applications to artificial intelligence of a calculating device using a neural network model are being researched. Feedforward and recurrent neural networks are known. It is desirable for the calculating device to have high computing power.

DETAILED DESCRIPTION

Figure 1:
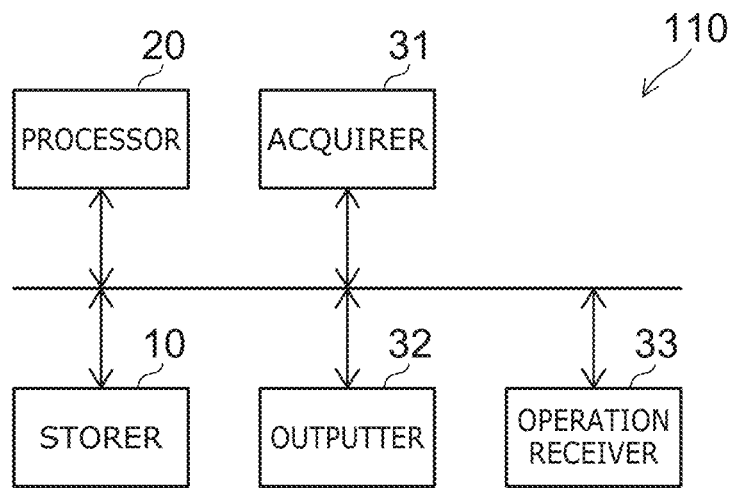
FIG. 1 is a schematic view illustrating a calculating device according to an embodiment.

According to one embodiment, a calculating device includes a processor. The processor is configured to at least acquire a data set $\{s\}$ and repeat a processing procedure. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes at least a part of a second variable set $\{y\}$. The second variable update includes updating an ith entry of a second variable $y_i$ by adding a second function and a third function to the ith entry of the second variable $y_i$ before the second variable update. The ith entry of the second variable $y_i$ is one of the second variable set $\{y\}$. A variable of the second function includes the ith entry of first variable $x_i$ and at least a part of the data set $\{s\}$. A variable of the third function includes at least a part of the first variable set $\{x\}$ and at least a part of the first parameter set $\{J\}$. The processor is configures to at least output at least a fourth function. A variable of the fourth function includes at least a part of the first variable set $\{x\}$ obtained after repeating the processing procedure and the second variable set $\{y\}$ obtained after repeating the processing procedure.

According to another embodiment, a calculation program causes a computer to at least acquire a data set $\{s\}$, repeat a processing procedure, and output a fourth function. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes at least a part of a second variable set $\{y\}$. The second variable update includes updating an ith entry of a second variable $y_i$ by adding a second function and a third function to the ith entry of the second variable $y_i$ before the second variable update. The ith entry of the second variable $y_i$ is one of the second variable set $\{y\}$. A variable of the second function includes the ith entry of first variable $x_i$ and at least a part of the data set $\{s\}$. A variable of the third function includes at least a part of the first variable set $\{x\}$ and at least a part of the first parameter set $\{J\}$. A variable of the fourth function includes at least a part of the first variable set $\{x\}$ obtained after repeating the processing procedure and the second variable set $\{y\}$ obtained after repeating the processing procedure.

According to another embodiment, a recording medium is computer-readable. A calculation program is recorded in the recording medium. The calculation program causes a computer to at least acquire a data set $\{s\}$, repeat a processing procedure, and output a fourth function. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes at least a part of a second variable set $\{y\}$. The second variable update includes updating an ith entry of a second variable $y_i$ by adding a second function and a third function to the ith entry of the second variable $y_i$ before the second variable update. The ith entry of the second variable $y_i$ is one of the second variable set $\{y\}$. A variable of the second function includes the ith entry of first variable $x_i$ and at least a part of the data set $\{s\}$. A variable of the third function includes at least a part of the first variable set $\{x\}$ and at least a part of the first parameter set $\{J\}$. A variable of the fourth function includes at least a part of the first variable set $\{x\}$ obtained after repeating the processing procedure and the second variable set {y} obtained after repeating the processing procedure.

According to another embodiment, a calculation method is disclosed. The method can include acquiring a data set {s}, repeating a processing procedure, and outputting a fourth function. The processing procedure includes a first variable update and a second variable update. The first variable update includes updating an ith entry of a first variable $x_i$ by adding a first function to the ith entry of the first variable $x_i$ before the first variable update (1 being an integer not less than 1 and not more than N, and N being an integer of 2 or more). The ith entry of the first variable $x_i$ is one of a first variable set {x}. A variable of the first function includes at least a part of a second variable set {y}. The second variable update includes updating an ith entry of a second variable $y_i$ by adding a second function and a third function to the ith entry of the second variable $y_i$ before the second variable update. The ith entry of the second variable $y_i$ is one of the second variable set {y}. A variable of the second function includes the ith entry of first variable $x_i$ and at least a part of the data set {s}. A variable of the third function includes at least a part of the first variable set {x} and at least a part of the first parameter set {J}. A variable of the fourth function includes at least a part of the first variable set {x} obtained after repeating the processing procedure and the second variable set {y} obtained after repeating the processing procedure.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic view illustrating a calculating device according to an embodiment.

As shown in FIG. 1, the calculating device 110 according to the embodiment includes, for example, a processor 20. The calculating device 110 may further include a storer 10. The processor 20 includes, for example, a CPU (Central Processing Unit), etc. The processor 20 includes, for example, an electronic circuit, etc. The storer 10 can store various data. The storer 10 is, for example, memory. The storer 10 may include at least one of ROM (Read Only Memory) or RAM (Random Access Memory). The calculating device 110 may be a calculation system.

In the example, an acquirer 31 is provided in the calculating device 110. For example, the acquirer 31 can acquire various data. The acquirer 31 includes, for example, an I/O port, etc.

In the example, an outputter 32 is provided in the calculating device 110. For example, the outputter 32 can output the processing results of the processor 20. The outputter 32 includes, for example, at least one of a display, a printing device, or a communication device. For example, the communication device may output to other devices, etc.

In the example, an operation receiver 33 is provided in the calculating device 110. For example, the operation receiver 33 receives operations by a user. The operation receiver 33 may include, for example, at least one of a keyboard, a mouse, a touch input panel, a voice recognition input device, or the like.

The multiple components that are included in the calculating device 110 can communicate with one another using at least one of a wireless or wired method. The locations where the multiple components included in the calculating device 110 are provided may be different from each other. For example, a general-purpose computer (e.g., a digital computer) may be used as the calculating device 110. For example, multiple computers that are connected to one another may be used as the calculating device 110. A dedicated circuit may be used as at least a part of the calculating device 110 (e.g., the processor 20, the storer 10, etc.). For example, multiple circuits that are connected to one another may be used as the calculating device 110.

Examples of the multiple components included in the calculating device 110 are described below.

In one example, for example, the calculating device 110 performs calculations corresponding to a recurrent neural network (NN). For example, input data is input to the recurrent NN; and output is output from the NN. The recurrent NN corresponds to a "reservoir." Training may be performed for the calculation using the "reservoir." For example, the "weights" of the training are corrected. The calculating device 110 is, for example, a reservoir computer.

An example of the operation performed by the calculating device 110 according to the embodiment will now be described.

Input data (e.g., a data set {s}) is input to the calculating device 110. The processor 20 acquires the input data and performs the information processing described below. The processing result of the processor 20 is output.

Figure 2:
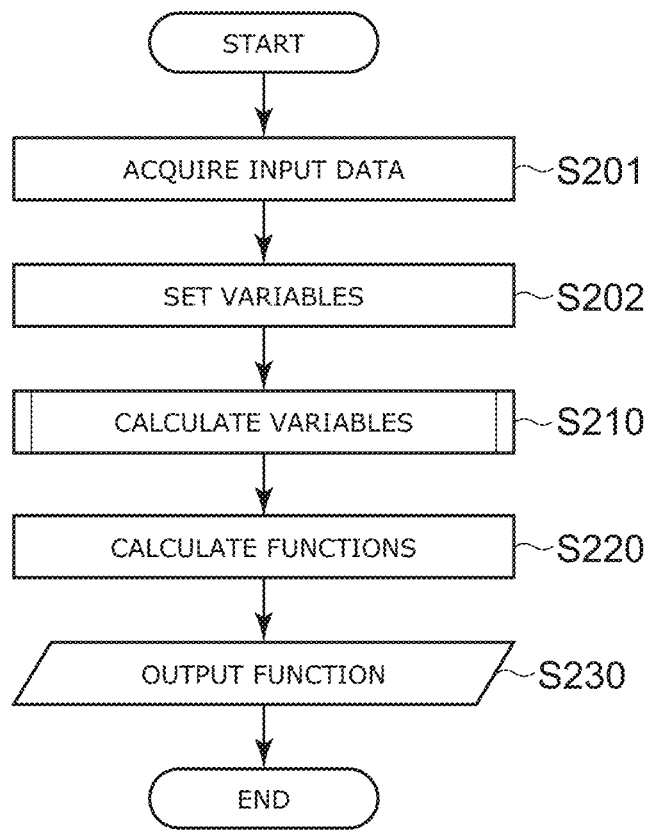
FIG. 2 is a flowchart illustrating the operation of the calculating device according to the embodiment.

FIG. 2 is a flowchart illustrating the operation of the calculating device according to the embodiment.

As shown in FIG. 2, the processor 20 acquires the input data (e.g., the data set {s}) (step S201). Then, variables are set (step S202); and the variables are calculated (step S210). To calculate the variables, the processor 20 repeats the processing procedure as described below.

Multiple variables are provided. The multiple variables include a first variable set {x} and a second variable set {y}. A first parameter set {J} also may be set in step S202. These variables and parameter sets are initialized to appropriate values in step S202. An example of the initialization is described below.

For example, the data set {s}, the first variable set {x}, the second variable set {y}, and the first parameter set {J} may be held (stored) in the storer 10. For example, the input data set {s} is stored in the storer 10. For example, the data set {s}, the first variable set {x}, the second variable set {y}, and the first parameter set {J} that are stored in the storer 10 are supplied to the processor 20. The processor 20 processes the first variable set {x}, the second variable set {y}, etc. For example, the first variable set {x} and the second variable set {y} are updated. The first variable set {x} and the second variable set {y} that are updated are provided to the storer 10. The first variable set {x} and the second variable set {y} after the update may be stored in the storer 10 and supplied to the processor 20; and further updating may be performed.

For example, the number of elements of the input data (the data set {s}) is S (S being an integer of 2 or more). For example, the data set {s} includes a kth entry of data $s_k$ (k being an integer not less than 1 and not more than (S−1)), etc. For example, the data set {s} may include a (k+1)th entry of data $s_{k+1}$.

For example, a number N of elements of the first variable set {x} is an integer of 2 or more. The first variable set {x} includes, for example, an ith entry of a first variable $x_i$ (1 being an integer not less than 1 and not more than N).

In one example, the number of elements of the second variable set {y} is the same as the number N. The second variable set {y} includes, for example, an ith entry of a second variable $y_i$.

The first parameter set {J} includes, for example, an ijth entry of a first parameter In one example, the first parameter set {J} is a symmetric matrix having a size of N×N. The diagonal entries of the symmetric matrix are 0. In one example, the nondiagonal entries of the first parameter set {J} are, for example, multiple random numbers. The multiple random numbers are values (uniform random numbers) in the interval of not less than −1 and not more than 1. The nondiagonal entries of the first parameter set {J} may be, for example, binary random numbers of −1 and +1. For example, nearly all of the nondiagonal entries may be 0.

In the calculation (e.g., the update) of the multiple variables (step S210), for example, the time evolution is calculated for the multiple variables. For example, the first variable set {x} is updated; and the second variable set {y} is updated. These calculations are repeated until a prescribed condition (described below) is satisfied. Step S210 is, for example, a subroutine.

After the subroutine (the update of the variables), for example, the processor 20 calculates functions (step S220). For example, functions (values of functions) are calculated for the first variable set {x} after the update and the second variable set {y} after the update. As described below, an arithmetic result of the functions and the weighting factors may be calculated.

The processor 20 outputs the calculated functions (or an arithmetic result of the functions and the weighting factors) (step S230).

An example of the calculation (the update) of step S210 recited above will now be described.

The processing procedure is repeated in the calculation (the update) of step S210. One processing procedure includes the first variable update and the second variable update.

The first variable update includes updating the ith entry of the first variable $x_i$ by adding a first function to the ith entry of the first variable $x_i$ before the first variable update. The ith entry of the first variable $x_i$ is one of the first variable set {x}. The variable of the first function includes at least a part of the second variable set {y}.

The first function includes, for example, a function $fx_i$({y}). The first function is, for example, a function of the second variable set {y}.

The second variable update includes updating the ith entry of the second variable $y_i$ by adding a second function and a third function to the ith entry of the second variable $y_i$ before the second variable update. The ith entry of the second variable $y_i$ is one of the second variable set {y}.

The variable of the second function includes the ith entry of the first variable $x_i$ and at least a part of the data set {s}. The variable of the second function may include a part of the second variable set {y}.

The second function includes, for example, a function $fy_i$($x_i$, {s}). The second function is, for example, a function of the ith entry of the first variable $x_i$ and the data set {s}.

The variable of the third function includes at least a part of the first variable set {x} and at least a part of the first parameter set {J}.

The third function includes, for example, a function $g_i$({x}, {J}). The third function is, for example, a function of the first variable set {x} and the first parameter set {J}.

After the processing (step S210) recited above, the processor 20 outputs at least a fourth function. The variable of the fourth function includes at least a part of the first variable set {x} obtained after repeating the processing procedure and the second variable set {y} obtained after repeating the processing procedure. The output of the fourth function corresponds to step S230.

For example, the processing illustrated in FIG. 2 corresponds to a reservoir computing. For example, the calculating device 110 calculates the time evolution of a nonlinear oscillator (e.g., a nonlinear vibrator). For example, the nonlinear oscillator corresponds to a reservoir. For example, the calculations that use the nonlinear oscillator as a physical model are performed by a digital computer.

A model relating to a nonlinear oscillator has been proposed by H. Goto, Sci. Rep. 6, 21686 (2016). In the embodiment, this model relating to the nonlinear oscillator is modified.

In the embodiment, the following first and second formulas are employed as equations of motion relating to the nonlinear oscillator.

$$\frac{dx_i}{dt} = y_i \tag{1}$$

$$\frac{dy_i}{dt} = -[D - p(t)]x_i - \beta_0 x_i^3 + c\sum_{j=1}^{N} J_{ij}x_j - \mu y_i \tag{2}$$

The first formula and the second formula correspond to multiple nonlinear oscillators. These nonlinear oscillators interact with each other. The number of multiple nonlinear oscillators is "N." "N" is an integer of 2 or more.

In the first formula and the second formula, "t" corresponds to time. The time evolution of the first variable $x_i$ and the second variable $y_i$ is calculated by the formulas recited above.

A parameter p(t) is changed to correspond to the input data (the data {s}). For example, the parameter p(t) has a temporal change having a waveform corresponding to the input time series of the data $s_k$. Because the parameter p(t) has the temporal change corresponding to the data $s_k$, for example, a complex time evolution can be induced for the nonlinear oscillator. Thereby, for example, the performance of the reservoir computing can be improved.

For example, a parallel computation of 2N variables (the first variable set {x} and the second variable set {y}) is performed based on, for example, the first formula and the second formula. For example, the calculation result is obtained by the parallel computation in a short period of time. A high calculation speed is obtained. The computing power can be increased.

The first formula and the second formula are differential equations. The first variable $x_i$ and the second variable $y_i$ are updated alternately when numerically solving these formulas. Divergence partway through the calculations can be suppressed by this method. The solution is easier to obtain without divergence.

In the reservoir computing using the nonlinear oscillator, the time series of the data $s_k$ (the time-series signal) is input to the nonlinear system at some rate (1/$T_{in}$). For example, the state $x_{ki}$ of the multiple nonlinear oscillators is derived every sampling time interval $T_s$ corresponding to the rate. For example, the state $x_{ki}$ is provided by the following third formula.

The state $x_{ki}$ of the multiple nonlinear oscillators corresponds to the measured values of the multiple nonlinear oscillators in the case where the multiple nonlinear oscillators are actually provided.

In the reservoir computing, for example, a function $z_k$ (the fourth function) of the derived state $x_{ki}$ of the multiple nonlinear oscillators and a weight $w_i$ are calculated. For example, the fourth function $z_k$ is provided by the following fourth formula.

$$z_k = \sum_{i=1}^{N} x_{ki} w_i \qquad (4)$$

The fourth function $z_k$ corresponds to the product of the derived state $x_k$ of the multiple nonlinear oscillators and the weight $w_i$.

As described above, training of the reservoir computing may be performed. For example, the weight $w_i$ is modified by training. For example, a constant term $X_{k0}$ is introduced. The constant term $X_{k0}$ is, for example, 1. For example, the weight $w_i$ is modified so that the fourth function $z_k$ (the calculation result) approaches some value $Z0_k$ (e.g., a target value) of the calculation result of the data $s_k$ (the input signal series). The modification of the weight $w_i$ corresponds to training.

For example, an error E is represented by the following fifth formula.

$$E = \sum_{k=1}^{S} (z_k - Z0_k)^2 \qquad (5)$$

The weight $w_i$ is determined to minimize an error E. For example, the weight $w_i$ is obtained by the matrix operation of the following sixth formula.

$$W = X^+ Z0 \qquad (6)$$

In the sixth formula, "W" is a column vector having the entries of the weight $w_i$. "X" is a matrix having the entries of the state $x_k$, of the multiple nonlinear oscillators. "Z" is a column vector having the entries of the value $Z0_k$. "X$^+$" is the Moore-Penrose pseudo-inverse matrix of the matrix "X."

In the embodiment, the "training" may be performed in a computer other than the calculating device 110. For example, at least a part of the modification (or the update) of the weight $w_i$ may be performed by a computer other than the calculating device 110.

In one example according to the embodiment, the first variable $x_i$ is sampled as the state $x_k$, of the multiple nonlinear oscillators.

In the description recited above, for example, the input rate of the input data (the data set {s}, i.e., the time-series signal) is the same as the sampling rate. In such a case, the input rate ($1/T_{in}$) of the time series of the data $s_k$ (the time-series signal) and the sampling time interval $T_s$ are the same.

In the embodiment, multiple sampling may be performed within the input time interval ($T_{in}$) of the time series of the data $s_k$ (the time-series signal). For example, in the case where sampling is performed V times within the time interval ($T_{in}$), the reservoir computing recited above may be performed by setting the number of multiple nonlinear oscillators to be N×V. V is an integer not less than 1 and not more than L. V may be an integer not less than 2 and not more than L. Examples of "L" are described below.

An example of the processing performed by the calculating device 110 (the processor 20) will now be described.

Figure 3:
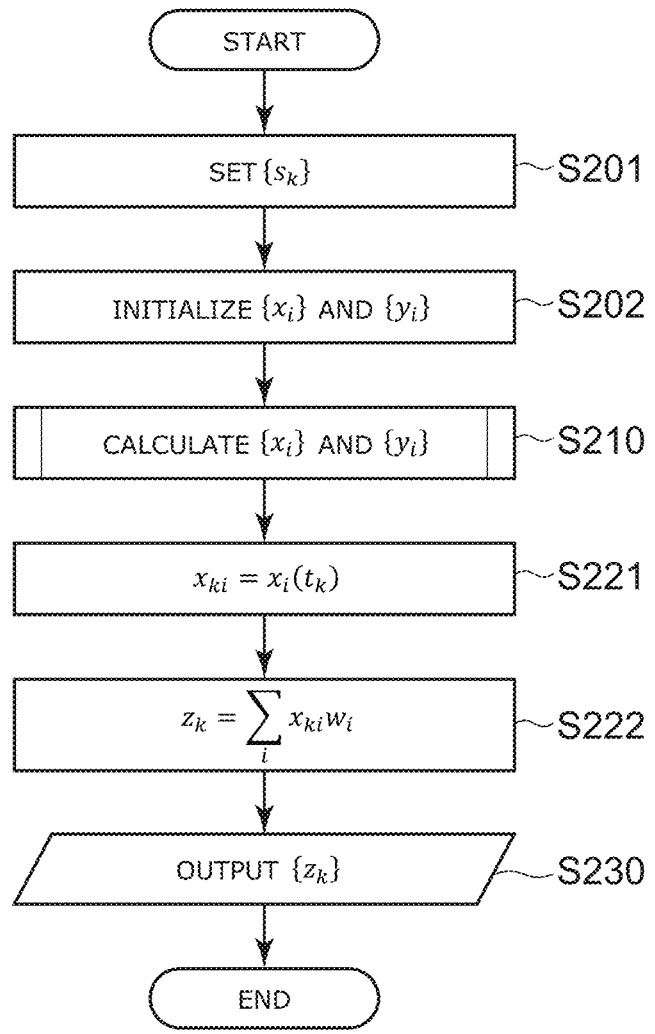
FIG. 3 is a flowchart illustrating the operation of the calculating device according to the embodiment.

FIG. 3 is a flowchart illustrating the operation of the calculating device according to the embodiment.

FIG. 3 corresponds to the flowchart of the reservoir computing.

The input data (the data set {s}) is set as shown in FIG. 3. The setting corresponds to step S201. For example, the input data (the data set {s}) is set by acquiring the input data (the data set {s}).

The first variable set {x} and the second variable set {y} are initialized as shown in FIG. 3. For example, the initialization corresponds to step S202. In one example, the initialization is performed using random numbers.

As shown in FIG. 3, the time evolution of the first variable set {x} and the second variable set {y} ({$x_i$} and {$y_i$}) is calculated as subroutines. The calculation corresponds to step S210. The first variable update and the second variable update recited above are performed as the time evolution of {$x_i$} and {$y_i$}.

The state $x_{ki}$ is calculated as shown in FIG. 3 (step S221). For example, the calculation is performed based on the third formula recited above.

The function $z_k$ (the fourth function) is calculated as shown in FIG. 3 (step S222). For example, the calculation is performed based on the fourth formula recited above.

The function set {$z_k$} is output as shown in FIG. 3 (step S230).

In one example, for example, the processing illustrated in FIG. 3 is performed by the processor 20. For example, at least a part of the multiple processing illustrated in FIG. 3 is performed by the calculating device 110. For example, a part of the multiple processing illustrated in FIG. 3 may be performed by a computer other than the calculating device 110. For example, at least a part of step S222 may be performed by a computer other than the calculating device 110.

Figure 5:
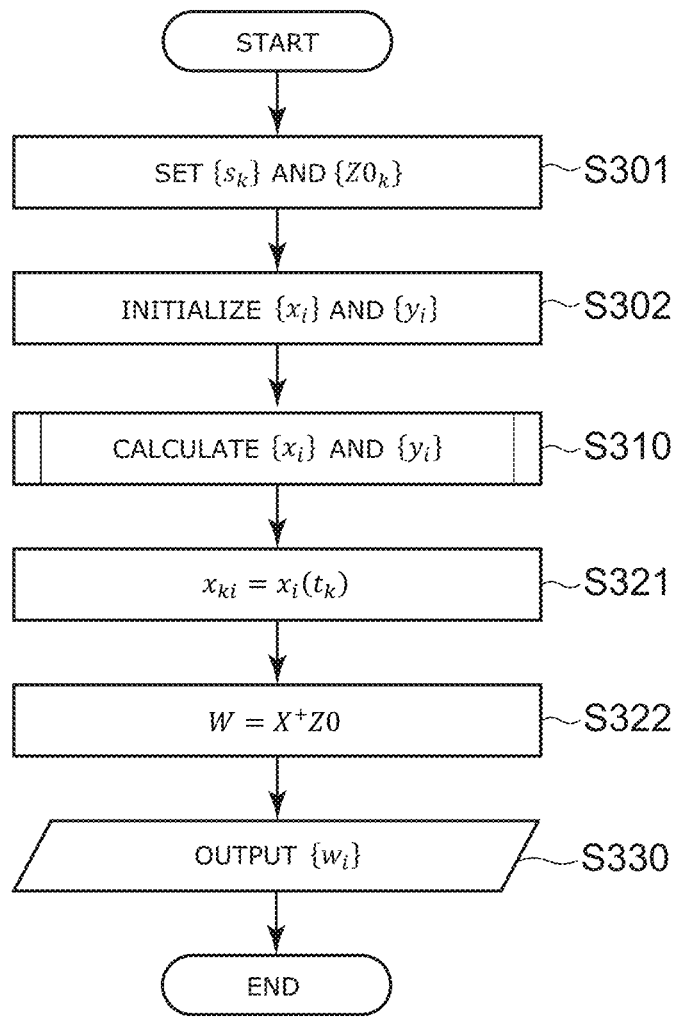
FIG. 5 is a flowchart illustrating an operation of the calculating device according to the embodiment.

The input data {s} may be supplied while performing the calculation of {$x_i$} and {$y_i$}. Thereby, real-time processing can be performed. For example, at least a part of step S201 in FIG. 3 may be performed simultaneously with at least a part of step S210. In FIG. 5 described below, at least a part of step S301 may be performed simultaneously with at least a part of step S310.

Figure 4:
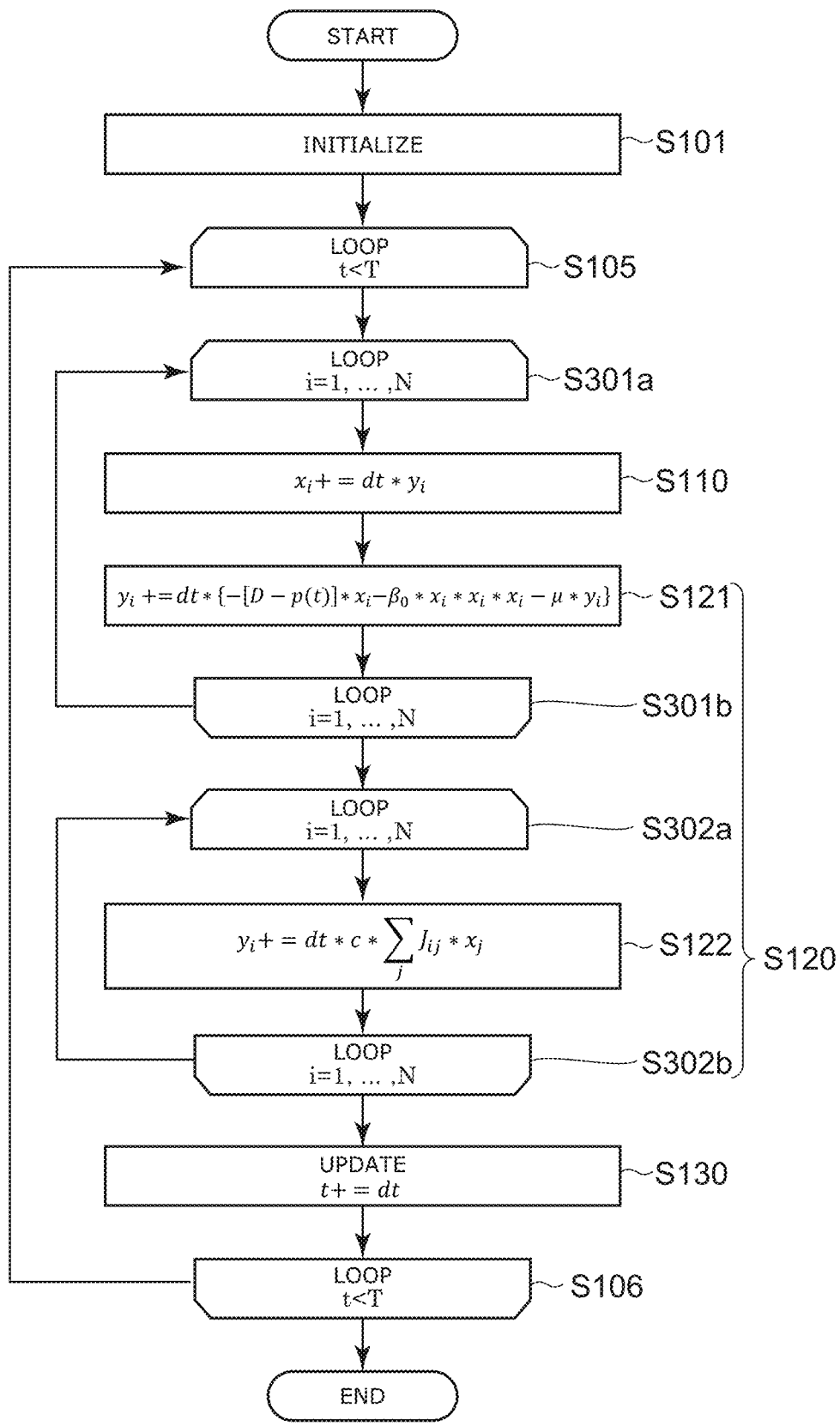
FIG. 4 is a flowchart illustrating an operation of the calculating device according to the embodiment.

FIG. 4 is a flowchart illustrating an operation of the calculating device according to the embodiment.

FIG. 4 illustrates the calculation (the subroutine) of the time evolution of {$x_i$} and {$y_i$}. FIG. 4 corresponds to at least a part of step S210 illustrated in FIG. 3.

The parameters are initialized as shown in FIG. 4 (step S101). For example, the time t of the second formula is set to 0. For example, the parameter p(t) of the second formula is generated. For example, the parameter p(t) is a "waveform" that is a function of time t.

As shown in FIG. 4, the time t is compared to a calculation time T (step S105). The flow proceeds to the next step S110 when the time t is smaller than the calculation time T. For example, the "processing procedure" includes the loop processing over "i" (step S301a and step S301b).

In step S110, the first variable $x_i$ after the update is set by adding dt*$y_i$ to the first variable $x_i$ before the update (step S110). In other words, the update of the first variable $x_i$ is performed. The symbol "*" corresponds to the product.

The second variable $y_i$ after the update is set by adding dt*{−(D−p(t))*$x_i$−$\beta_0$*$x_i$*$x_i$*$x_i$−μ*$y_i$} to the second variable $y_i$ before the update (step S121). In other words, the update of the second variable $y_i$ is performed. dt*{−(D−p(t))*$x_i$−$\beta_0$*$x_i$*$x_i$*$x_i$−μ*$y_i$} is one example of the second function.

For example, the calculation time T, the time step dt, the parameter D, the parameter p(t), the parameter $\beta_0$, and the parameter $\mu$ are set appropriately. The term of "$-\mu^*y_i$" acts in the direction of suppressing divergence when the parameter $\mu$ is positive. The solution is obtained stably and easily.

The second variable $y_i$ after the update is set by adding $dt^*c\Sigma J_{ij}^*x_j$ to the second variable $y_i$ (step S122). $dt^*c\Sigma J_{ij}^*x_j$ is one example of the third function. Thus, in the example, the third function (the function $g_i(\{x\}, \{y\}, \{J\})$) includes the product-sum operation of the first variable set $\{x\}$ and the first parameter set $\{J\}$. Step S122 is loop processing over "i" (step S302a and step S302b).

In step S122, the parameter "c" may be determined according to, for example, an estimated value $\sigma$ of the standard deviation of the nondiagonal entries of the first parameter set $\{J\}$. For example, the parameter "c" is equal to $0.7^*D/\{\sigma^*(N)^{1/2}\}$.

Step S121 and step S122 are included in step S120. For example, step S120 corresponds to the second variable update.

Subsequently, the time t is updated (step S130). For example, the time t after the update is set by adding the time step dt to the time t before the update.

The updated time t is compared to the calculation time T (step S106). The flow returns to step S105 when the updated time t is smaller than the calculation time T. Then, steps S110, S120, and S130 are performed further.

When the updated time t is not less than the calculation time T, the flow ends; and the function is output (step S220 of FIG. 2 and step S221 and step S222 of FIG. 3).

For example, at least a part of the processing illustrated in FIG. 4 is performed by the processor 20.

FIG. 5 is a flowchart illustrating an operation of the calculating device according to the embodiment.

FIG. 5 corresponds to a flowchart of training.

The time series of the data $s_k$ (the time-series signal) and the value set $\{Z0_k\}$ are set as shown in FIG. 5 (step S301). The value set $\{Z0_k\}$ is the calculation result obtained for some data $s_k$ (the input signal series) that is input. The value set $\{Z0_k\}$ is, for example, the target value.

The first variable set $\{x\}$ and the second variable set $\{y\}$ ($\{x_i\}$ and $\{y_i\}$) are initialized as shown in FIG. 5 (step S302).

The first variable set $\{x\}$ and the second variable set $\{y\}$ ($\{x_i\}$ and $\{y_i\}$) are calculated as shown in FIG. 5 (step S310). These variable sets are updated. Step S310 corresponds to step S210 illustrated in FIG. 3.

The state $x_{ki}$ is calculated as shown in FIG. 5 (step S321). Step S321 corresponds to step S221 illustrated in FIG. 3.

As shown in FIG. 5, "W" which is the column vector having the entries of the weight $w_i$ is calculated (step S322).

For example, "W" is calculated by the sixth formula recited above. The value set $\{w_i\}$ that relates to the weight is derived.

As shown in FIG. 5, the value set $\{w_i\}$ that relates to the weight is output.

In one example, for example, the processing illustrated in FIG. 5 is performed by the processor 20. For example, at least a part of the multiple processing illustrated in FIG. 5 is performed by the calculating device 110. For example, a part of the multiple processing illustrated in FIG. 5 may be performed by a computer other than the calculating device 110.

Figure 6:
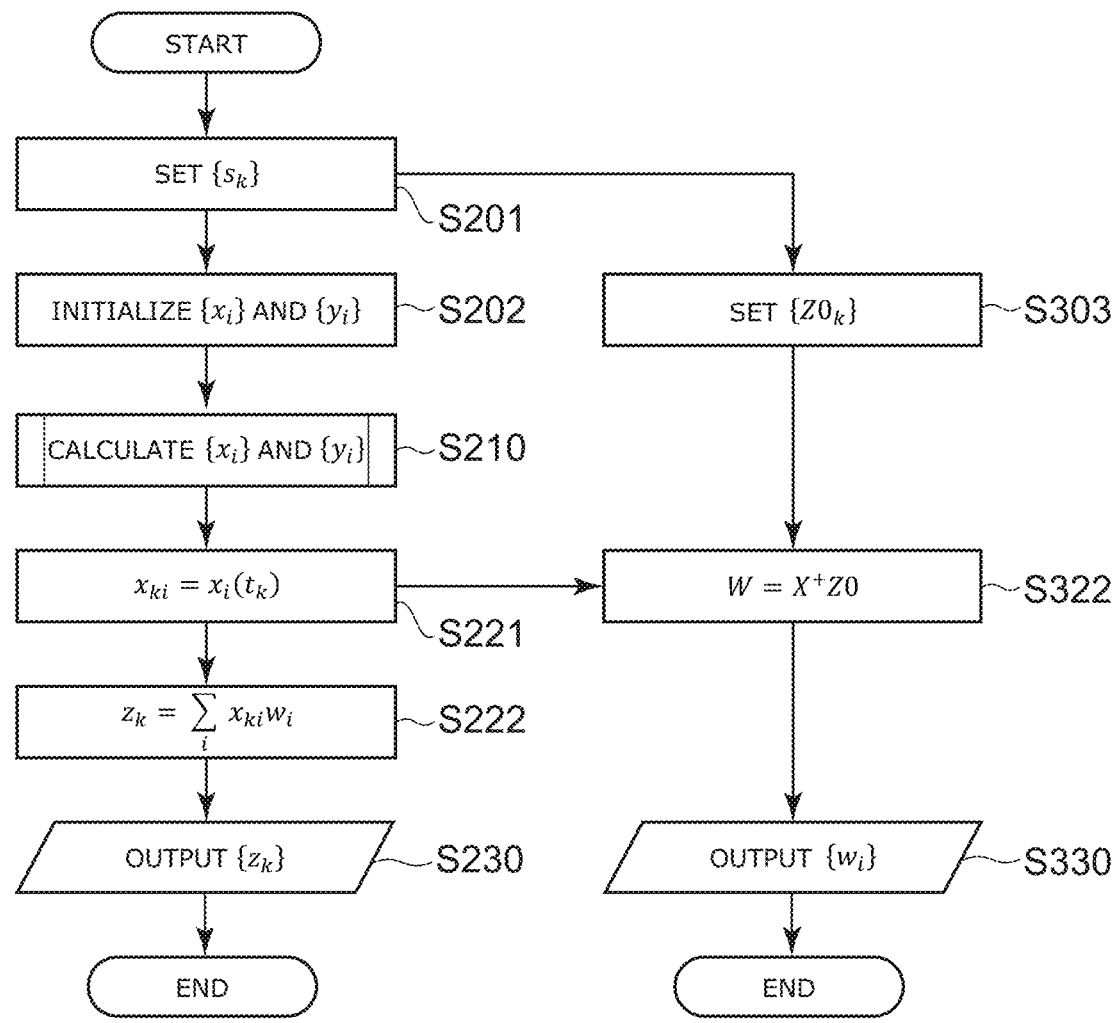
FIG. 6 is a flowchart illustrating an operation of the calculating device according to the embodiment.

FIG. 6 is a flowchart illustrating an operation of the calculating device according to the embodiment.

The reservoir computing and the training are described in FIG. 6.

For example, the input data (e.g., the data set $\{s\}$) is set (step S201). Subsequently, steps S202, S210, S221, S222, and S230 are performed as described above in reference to FIG. 3.

On the other hand, the value set $\{Z0_k\}$ (e.g., the target value) is set (step S303). The value set $\{Z0_1\}$ corresponds to the calculation result of the data $s_k$ (the input signal series) that is input.

Subsequently, the column vector "W" having the entries of the weight $w_i$ is derived using the value set $\{Z0_k\}$ and the calculation result of the state $x_{ki}$ obtained in step S221 (step S322). Then, the weight $w_i$ is output (step S330).

The processing recited above (including, for example, algorithms) may be performed by, for example, a parallel digital computer such as a PC cluster, a GPU, a dedicated circuit, etc. The dedicated circuit may include, for example, at least one of a FPGA, a gate array, or an ASIC.

An example of the calculation result will now be described. The following parameters of the nonlinear oscillator used as the model are employed.

The parameter D and the parameter $\beta_0$ are 1. The nondiagonal entries of the first parameter set $\{J_{ij}\}$ ($\{J\}$) are random numbers not less than $-1$ and not more than 1. The estimated value $\sigma$ of the standard deviation is $\frac{1}{3}^{1/2}$. The time step dt is 0.2.

The reservoir computing is performed by a PC cluster. The reservoir computing is performed by the following method. The sampling time interval $T_s$ is provided; and the equations of motion in the first formula and the second formula are solved at the time of the product of $T_s$ and the "total sampling number."

The input data (e.g., the data set $\{s\}$) is binary random numbers (0 or 1). The kth entry of the data $s_k$ of the data set $\{s\}$ is 0 or 1. The data $s_k$ (the random number of 0 or 1) is provided every sampling time interval $T_s$ and converted into the parameter p(t) having the continuous waveform. The waveform (the parameter p(t)) that corresponds to the kth entry of input data is applied from the time $T_s(k-1)$ to the time $T_sk$.

In the example, the conversion from the data $s_k$ into the parameter p(t) is performed using the triangle wave of the following seventh and eighth formulas.

$$T_s(k-1) \sim T_s(k-1/2): p(t) = p_{DC} + 2p_{AC}(2s_k-1)(t/T_s - k + 1) \tag{7}$$

$$T_s(k-1/2) \sim T_sk: p(t) = p_{DC} - 2p_{AC}(2s_k-1)(t/T_s - k) \tag{8}$$

The kth entry of the state $x_{ki}$ (corresponding to the measured values of the multiple nonlinear oscillators) is sampled at the time $T_sk$. In the seventh formula and the eighth formula, a parameter $p_{AC}$ is 0.2. The calculation is performed by modifying the parameter $P_DC$, the sampling time interval $T_s$, the number N, and the parameter $\mu$.

In one example, the sampling number is 5000. The results when the sampling number is 1 to 1000 are not used in order to exclude the effects of the initial conditions. Training is performed when the sampling number is 1000 to 3000. The calculation results when the sampling number is 4000 to 5000 are used to evaluate the computing power. The sampling number is larger than the number N.

A short-term memory task and a parity check task are used as tasks for evaluating the computational performance of the reservoir. The short-term memory task relates to short-term memory for a binary input data $s_k$ (0 or 1). The memory capacity can be evaluated by the short-term memory task. The nonlinear capacity can be evaluated by the parity check task. It is considered that these two capacities correspond to the computing power when performing real-time information processing.

The target output of the short-term memory task is the input data delayed by a sampling time T. For example, the following ninth formula is used.

$$Z0_k = s_{k-\tau} \quad (9)$$

As in the ninth formula, $Z0_k = s_{k-\tau}$, wherein $r = 0, 1, 2, \ldots$.

The target output of the parity check task is the parity of the sum of the input data up to the previous sampling time $\tau$. For example, the following tenth formula is used. The function $Q(e)$ is a function that is 0 when e is even and 1 when e is odd.

$$Z0_k = Q\left(\sum_{m=0}^{\tau} s_{k-m}\right) \quad (10)$$

The computational performance of the short-term memory task and the parity check task are evaluated by comparing the target outputs with the outputs using the trained weight $w_i$. A performance capacity C is represented by the following eleventh formula.

$$C = \sum_{\tau=0}^{\tau_{max}} C_\tau \quad (11)$$

In the eleventh formula, the "$C_\tau$" is the square of the correlation coefficient between the function $z_k$ and the value $Z0_k$ at each of the multiple sampling times $\tau$. The performance capacity C is the sum of "$C_\tau$" over $\tau$. In the example, $\tau_{max}$ is 100. The "$C_\tau$" has a maximum value of 1 when the function $z_k$ (the fourth function, i.e., the function of the weight $w_i$ and the derived state $x_{ki}$ of multiple nonlinear oscillators) and the value $Z0_k$ (e.g., the target value) match. "$C_\tau$" is less than 1 when the function $z_k$ and the value $Z0_k$ are different.

In the example, the evaluation is performed for fifteen mutually-different data sets. The data sets include the input data (the data set $\{s\}$, the data $s_k$, etc.) and the first parameter set $\{J\}$ (the first parameter etc.). The performance capacity C that is obtained is averaged.

Figure 7:
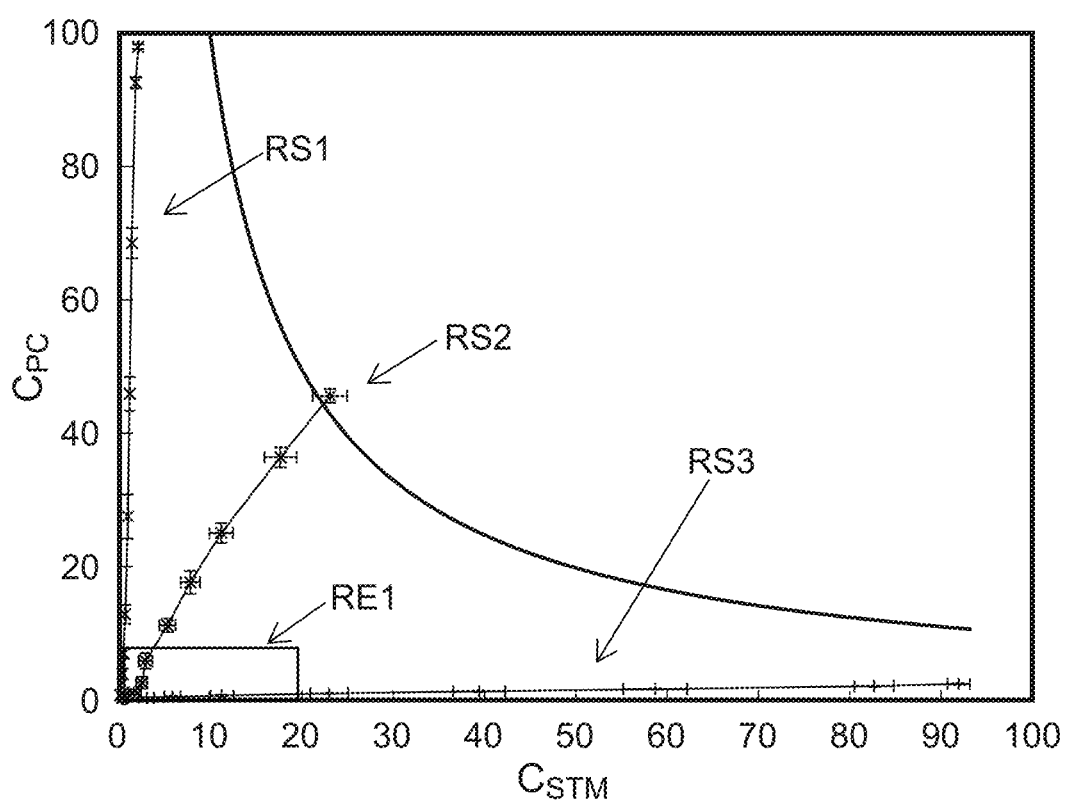
FIG. 7 is a graph illustrating characteristics of the calculating device according to the embodiment.

FIG. 7 is a graph illustrating characteristics of the calculating device according to the embodiment.

The horizontal axis of FIG. 7 is a short-term memory capacity $C_{STM}$. The vertical axis of FIG. 7 is a parity check capability $C_{PC}$. For a result RS1, the parameter $p_{DC}$ is 5.5; the parameter $\mu$ is 0.001; and the sampling time interval $T_s$ is 50. For a result RS2, the parameter $p_{DC}$ is 3; the parameter $\mu$ is 0.0005; and the sampling time interval $T_s$ is 200. For a result RS3, the parameter $p_{DC}$ is 5.5; the parameter $\mu$ is 0.0005; and the sampling time interval $T_s$ is 100. The results when the number N is 1, 2, 5, 10, 20, 50, 100, 200, 500, and 1000 are illustrated for the results RS1 to RS3.

A result RE1 of a reference example also is shown in FIG. 7. The result RE1 is the result of calculations using recurrent NNs called echo-state networks (ESNs, referring to Non-Patent Literature 1). ESNs are used for comparison when researching reservoir computing (e.g., referring to Non-Patent Literature 4).

For the results RS1 to RS3 as shown in FIG. 7, the capacities (the short-term memory capacity $C_{STM}$ and the parity check capability $C_{PC}$) increase monotonously as the number N increases according to the parameters (the parameter $P_{DC}$, the parameter $\mu$, and the sampling time interval $T_s$).

There are conditions causing one of the short-term memory or the parity check to increase. The maximum value of the short-term memory capacity $C_{STM}$ is about 100; and the maximum value of the parity check capability $C_{PC}$ is about 100. These values are markedly larger than the values for the ESNs of the reference example.

As in the result RS2 as shown in FIG. 7, there is a condition causing both the short-term memory and the parity check to increase. Even the case of the result RS2, the short-term memory capacity $C_{STM}$ and the parity check capability $C_{PC}$ are greater than the values of the ESNs of the reference example.

A range ($C_{PC} \leq 1000/C_{STM}$) illustrated by a curve is shown in FIG. 7. This range shows an estimate of the range where the short-term memory capacity $C_{STM}$ and the parity check capability $C_{PC}$ are distributed.

Thus, according to the calculating device 110 according to the embodiment, a calculating device having higher computing power can be provided.

As recited above, the conversion from the data $s_k$ into the parameter p(t) may be performed using a triangle wave (e.g., referring to the seventh formula and the eighth formula). For example, when the data $s_k$ is greater than a reference value, the update parameter increases and subsequently decreases during L times of updating to reach, after the L times of updating, the value before the L times of updating. When the data $s_k$ is less than the reference value, the update parameter decreases and subsequently increases during the L times of updating to reach, after the L times of updating, the value before the L times of updating.

Or, for example, when the data $s_k$ is greater than the reference value, the update parameter decreases and subsequently increases during the L times of updating to reach, after the L times of updating, the value before the L times of updating. When the data $s_k$ is less than the reference value, the update parameter increases and subsequently decreases during the L times of updating to reach, after the L times of updating, the value before the L times of updating.

A neural network (NN) that is a network of elements having a nonlinear input/output relationship is being researched as an engineering model of information processing. NNs are broadly divided into a feedforward type in which the signals are propagated in one direction, and a recurrent type in which an autoregressive closed loop is provided in the network. It is considered that deep learning is effective for the training of a feedforward type NN. Feedforward type NNs are utilized in a wide range of fields such as voice recognition, image recognition, natural language processing, etc.

On the other hand, in a recurrent NN, the input history is storable by the closed loop. For example, there are expectations for applications of recurrent NNs to time-series information processing. Time-series information processing includes, for example, speech recognition, handwriting recognition, robot control, financial forecast, anomaly detection, etc. For example, the order, the context, etc., are important in time-series information processing.

A reservoir computing may be used as the training method of a recurrent NN. The output weights are trained by the reservoir computing. The calculation amount is low because the training is performed by a linear regression. Reservoir computing was proposed in NN software using an activation function. Subsequently, it was proposed to perform similar calculations using a physical system (hardware) having a nonlinear complex input/output relationship. For example, reservoir computing that uses an electronic circuit, a semiconductor laser, a magnetic element, etc., is known. However, higher computing power is necessary to enable practical use. It is necessary to increase the reliability of the calculations.

In the embodiment, for example, a reservoir computing can be performed by a digital computer. High computing power is obtained. High reliability is obtained. Time-series information processing can be performed efficiently.

As described above, the calculating device 110 may include the storer 10 (referring to FIG. 1). The storer 10 may store the data set {s}, the first variable set {x}, the second variable set {y}, and the first parameter set {J}. In such a case, the processor 20 acquires the data set {s}, the first variable set {x}, the second variable set {y}, and the first parameter set {J} stored in the storer 10. For example, the processor 20 provides, to the storer 10, the first variable $x_i$ after the updating of the first variable update. The processor 20 provides, to the storer 10, the second variable $y_i$ after the updating of the second variable update. The storer 10 stores the updated first variable $x_i$ and the updated second variable $y_i$.

As described above, the parameter p(t) is changed according to the data set {s}. Thereby, for example, the performance of the reservoir computing can be improved by inducing a complex time evolution in the nonlinear oscillator. For example, the data set {s} includes the kth entry of the data $s_k$ (k being an integer not less than 1 and not more than (S−1), and S being an integer of 2 or more). The second function includes at least one update parameter (the parameter p(t)). For example, the update parameter changes according to the data $s_k$. The processor 20 may change the update parameter according to the data $s_k$.

For example, the data set {s} includes the kth entry of the data $s_k$ (k being an integer not less than 1 and not more than (S−1)) and the (k+1)th entry of the data $s_{k+1}$. In one example, in the second variable update, the processor 20 updates the second variable $y_i$ L times (L being an integer not less than 1 and not more than LM) using the second function including a first update parameter (one of the parameters p(t)), and subsequently updates the second variable $y_i$ L times using the second function including a second update parameter (another one of the parameters p(t)). The first update parameter is based on the data $s_k$. The second update parameter is based on the data $s_{k+1}$. Thus, the parameter p(t) changes based on different data of the data set {s}.

For example, the second function includes a term including at least a part of the second variable set {y}. For example, the term is 0 when the second variable $y_i$ is 0. The value of the second function decreases monotonously as the second variable $y_i$ increases.

In the embodiment, the calculation result may be output each time the parameter p(t) is changed according to the data set {s}. For example, the fourth function (the function $z_k$) after the L times of updating using the second function including the first update parameter (the one of the parameters p(t)) may be output; and the fourth function (the function $z_k$) after the L times of updating using the second function including the second update parameter (the other one of the parameters p(t)) may be output. The function $z_k$ is a function of the weight $w_i$ and the derived state $x_{ki}$ of the multiple nonlinear oscillators.

The processor 20 may output the fourth function each time the processing procedure is repeated. The processor 20 may output the fourth function after performing at least one repetition of the processing procedure.

In one example as described above, the first function includes the function $fx_i(\{x\}, \{y\})$. The second function includes the function $fy_i(x_i, \{y\}, \{s\})$. The third function includes the function $g_i(\{x\}, \{y\}, \{J\})$.

For example, the function $fy_i(x_i, \{y\}, \{s\})$ recited above includes a nonlinear function of the first variable $x_i$. For example, the calculations of an NN based on the operation of a nonlinear oscillator are performed by the calculating device 110.

For example, the function $g_i(\{x\}, \{y\}, \{J\})$ includes a product-sum operation of the first variable set {x} and the first parameter set {J}.

Training may be performed as described above. For example, the weight $w_i$ is introduced appropriately. For example, as shown in FIG. 5 or FIG. 6, the processor 20 may output the calculation result set {z} (i.e., the function $z_k$, i.e., the fourth function) of the first variable set {x} after the update (i.e., the state $x_{ki}$) and the second parameter set {w} (i.e., the weight $w_i$).

As illustrated in FIG. 5 and FIG. 6, the processor 20 may derive and output the second parameter set {w} (i.e., the weight $w_i$) based on the fourth function (the function $z_k$) and the value set {Z0}. For example, the value set {Z0} is the calculation result of some data set {s} that is input.

As described above, the training is performed by modifying the weight $w_i$ so that the fourth function $z_k$ (the calculation result) approaches the value set {Z0} (the value $Z0_k$, e.g., the target value).

The storer 10 also may store the second parameter set {w} (i.e., the weight $w_i$). The processor 20 reads the second parameter set {w} stored in the storer 10 and performs the processing recited above. The second parameter set {w} after the processing may be supplied to the storer 10.

At least a part of the processing recited above may be performed by a different calculator (processing circuit).

Figure 8:
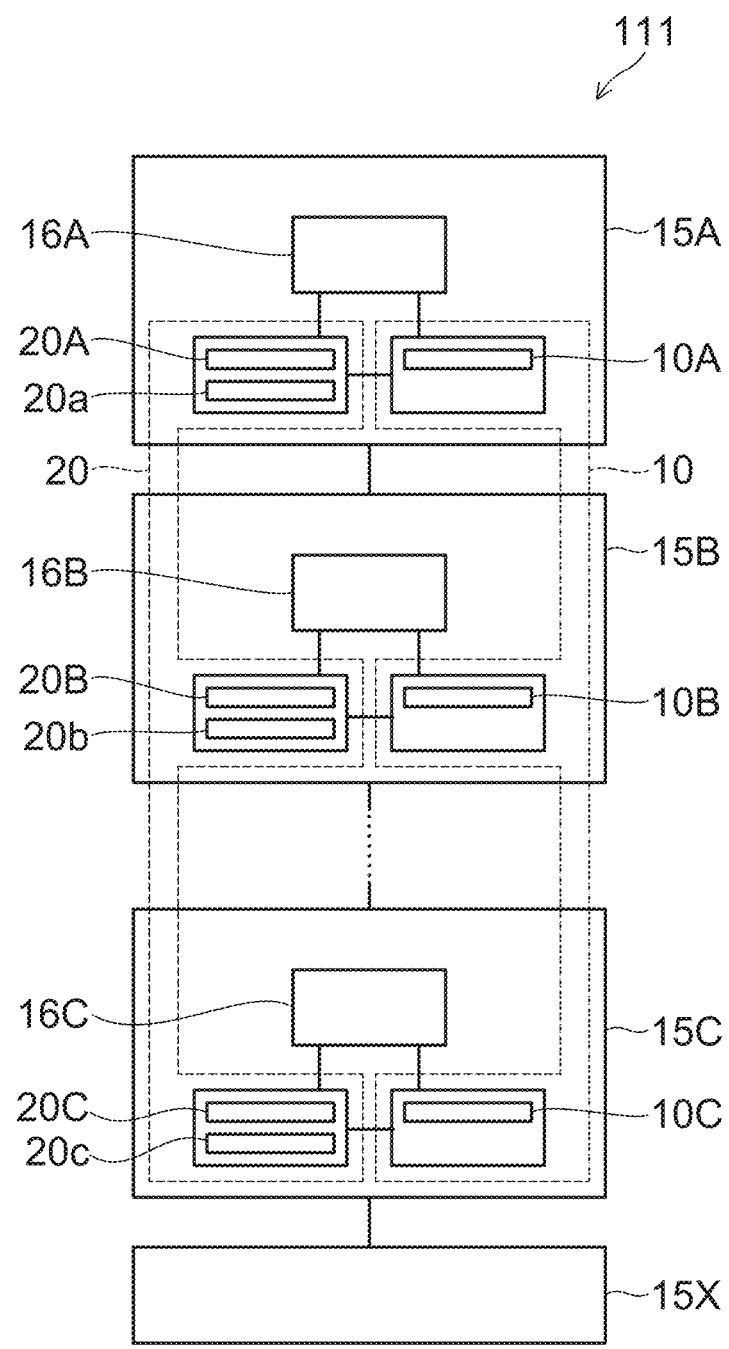
FIG. 8 is a schematic view illustrating a calculating device according to the embodiment.
Figure 9:
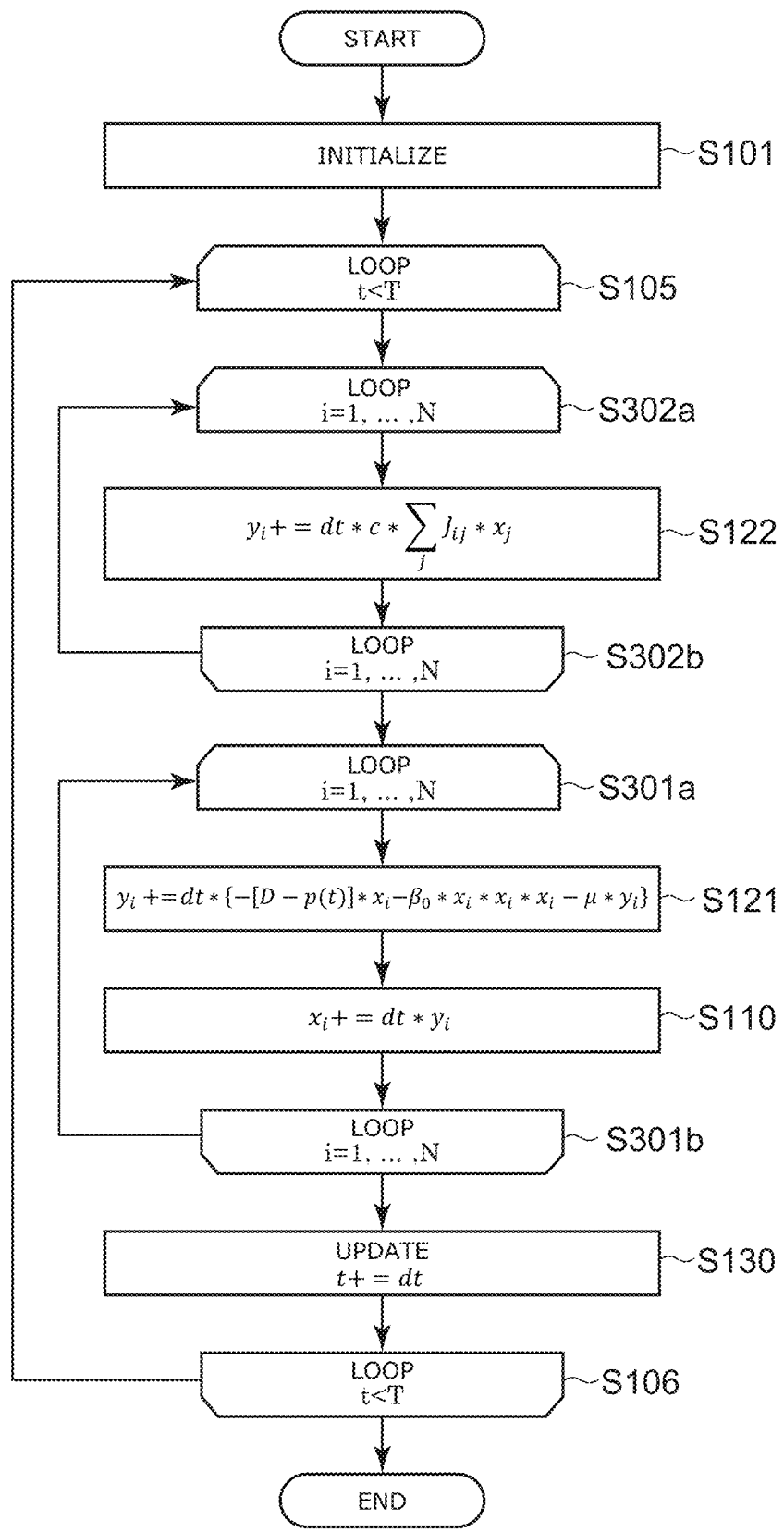
FIG. 9 is a flowchart illustrating an operation of the calculating device according to the embodiment.

FIG. 8 is a schematic view illustrating a calculating device according to the embodiment.

As shown in FIG. 8, the calculating device 111 according to the embodiment includes multiple circuit parts (a first circuit part 15A, a second circuit part 15B, a third circuit part 15C, etc.). Each of these multiple circuit parts may be, for example, one computer. Each of these multiple circuit parts may be, for example, one electronic circuit (e.g., a semiconductor circuit). These multiple circuit parts can communicate (e.g., transmit and receive data) with one another. A controller 15X is further provided in the calculating device 111. The operations of the multiple circuit parts (including communications) are controlled by the controller 15X.

For example, a processor (a calculator) and a storer (a storage region or a memory part) are provided in each of the multiple circuit parts. A controller also may be provided. Parallel computation is performed by the multiple circuit parts (the first circuit part 15A, the second circuit part 15B, the third circuit part 15C, etc.). The number of the multiple circuit parts is arbitrary.

For example, a first calculator 20A and a first storage region 10A are provided in the first circuit part 15A. In the example, the first circuit part 15A further includes a first controller 16A. The operations of the first calculator 20A and the first storage region 10A are controlled by the first controller 16A.

For example, a second calculator 20B and a second storage region 10B are provided in the second circuit part 15B. In the example, the second circuit part 15B further includes a second controller 16B. The operations of the second calculator 20B and the second storage region 10B are controlled by the second controller 16B.

For example, a third calculator 20C and a third storage region 10C are provided in the third circuit part 15C. In the example, the third circuit part 15C further includes a third controller 16C. The operations of the third calculator 20C and the third storage region 10C are controlled by the third controller 16C.

In the example, another calculator 20a, another calculator 20b, and another calculator 20c are provided respectively in the multiple circuit parts (the first circuit part 15A, the second circuit part 15B, the third circuit part 15C, etc.). The other calculator 20a may perform calculations separately from the first calculator 20A. The other calculator 20b may perform calculations separately from the second calculator 20B. The other calculator 20c may perform calculations separately from the third calculator 20C.

Thus, the calculations may be performed separately by the multiple circuit parts. Further, other calculations may be performed by a different calculator in one of the multiple circuit parts. The other calculations include, for example, parallel computation.

Thus, the processor 20 may include multiple calculators (e.g., the first to third calculators 20A to 20C, the calculators 20a to 20c, etc.). A part of the processing performed by the processor 20 may be performed by one of the multiple calculators; and another part of the processing performed by the processor 20 may be performed by another one of the multiple calculators.

As described above, for example, the product-sum operation of the first variable set {x} and the first parameter set {J} is performed. A part of the product-sum operation may be performed by one of the multiple calculators. The other part of the product-sum operation may be performed by another one of the multiple calculators.

For example, a part of the first variable update may be performed by one of the multiple calculators. Another part of the first variable update may be performed by another one of the multiple calculators.

For example, a part of the second variable update may be performed by one of the multiple calculators. Another part of the second variable update may be performed by another one of the multiple calculators.

High-speed calculations are possible by performing separate calculations (e.g., parallel computation) by different calculators.

As described above, the embodiment may include a calculation system. One or multiple processors are provided in the calculation system. The one or multiple processors repeat the processing procedure recited above. The multiple processors correspond to the multiple calculators recited above.

In the processing illustrated in FIG. 4, the second variable update (step S120) is performed after the first variable update (step S110). In the embodiment, the first variable update (step S110) may be performed after the second variable update (step S120).

As shown in FIG. 4, the second variable update (step S120) includes step S121 (the first sub-update) and step S122 (the second sub-update). The first sub-update includes updating the ith entry of the second variable $y_i$ by adding the second function to the ith entry of the second variable $y_i$ before the first sub-update. The second sub-update includes updating the ith entry of the second variable $y_i$ by adding the third function to the ith entry of the second variable $y_i$ before the second sub-update.

Various modifications of the processing (the subroutine) illustrated in FIG. 4 are possible as described below.

FIG. 9 to FIG. 15 are flowcharts illustrating operations of the calculating device according to the embodiment.

These figures illustrate the time evolution calculation (the subroutines) of the first variable set {x} and the second variable set {y} ({$x_i$} and {$y_i$}).

As shown in FIG. 9 to FIG. 15, the first variable update (step S110), the first sub-update (step S121), and the second sub-update (step S122) may be performed in various orders with various loops.

Figure 10:
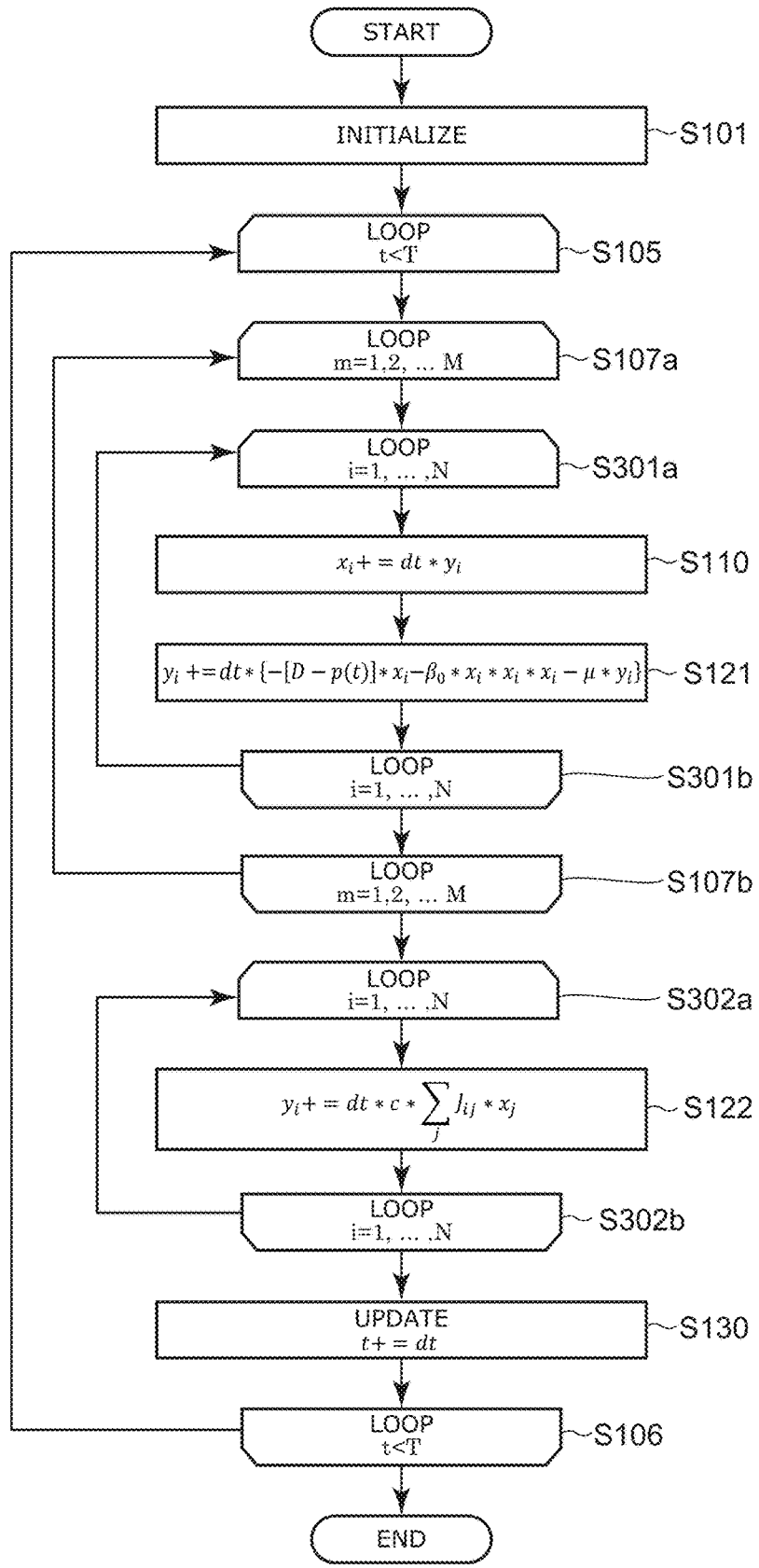
FIG. 10 is a flowchart illustrating an operation of the calculating device according to the embodiment.
Figure 11:
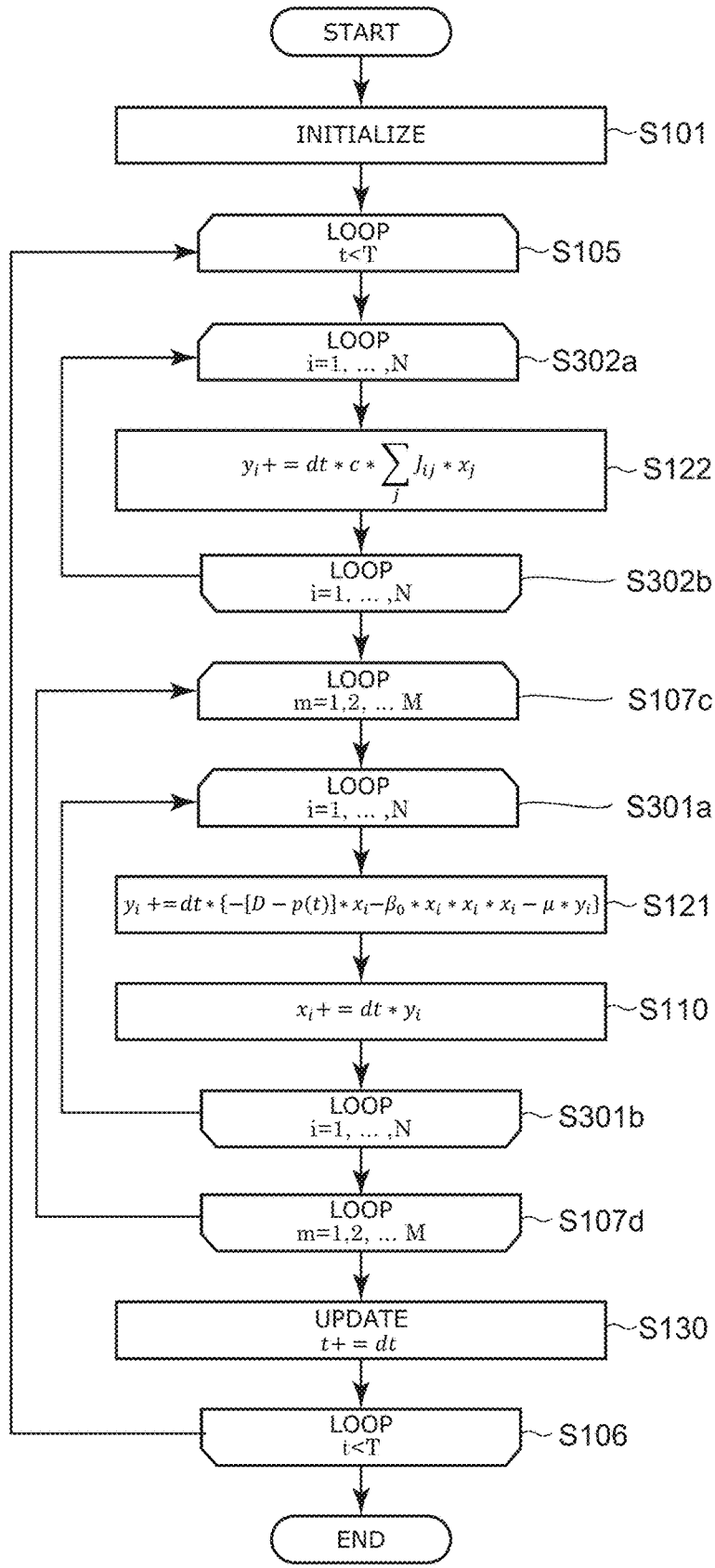
FIG. 11 is a flowchart illustrating an operation of the calculating device according to the embodiment.
Figure 12:
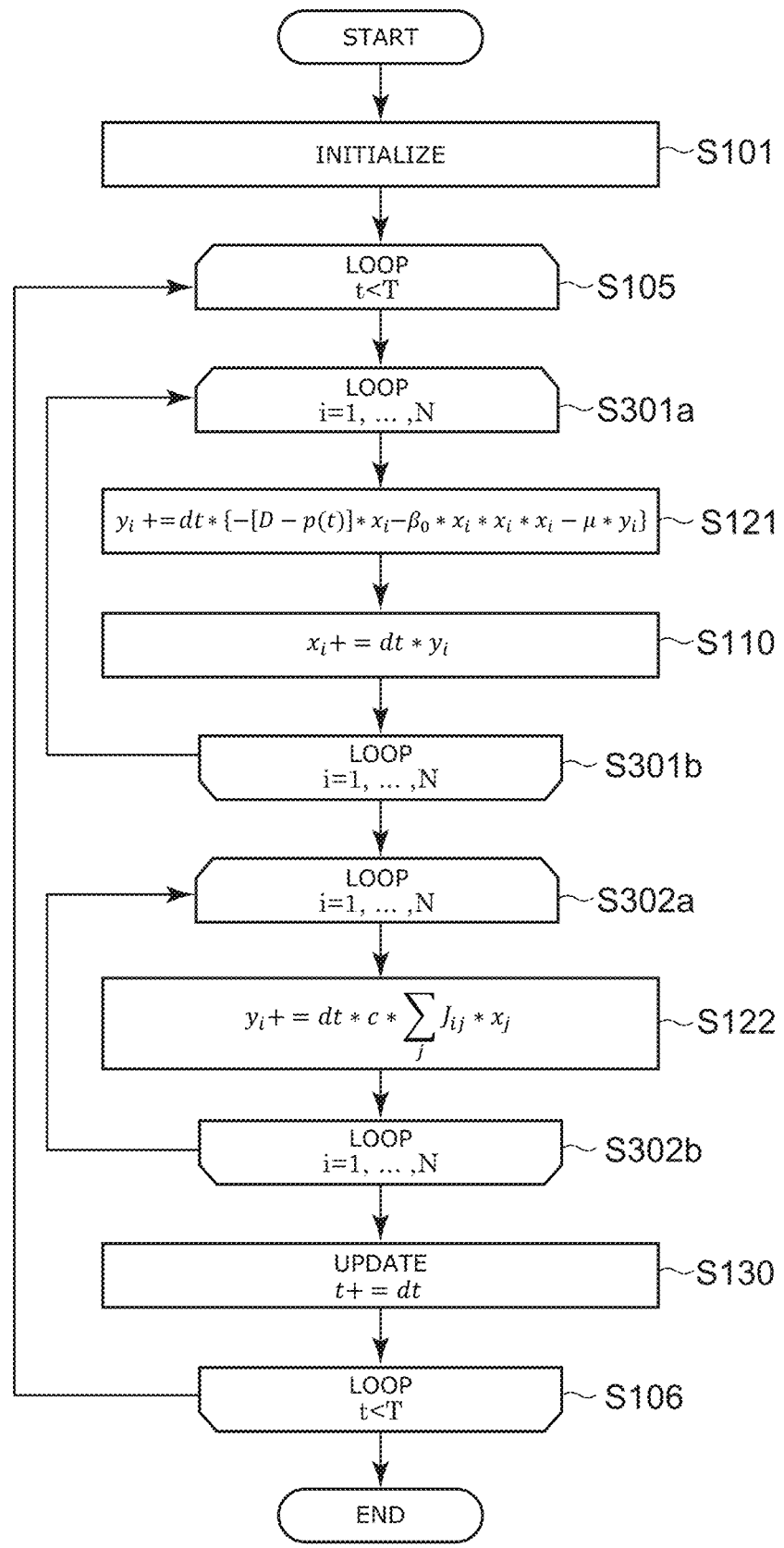
FIG. 12 is a flowchart illustrating an operation of the calculating device according to the embodiment.
Figure 13:
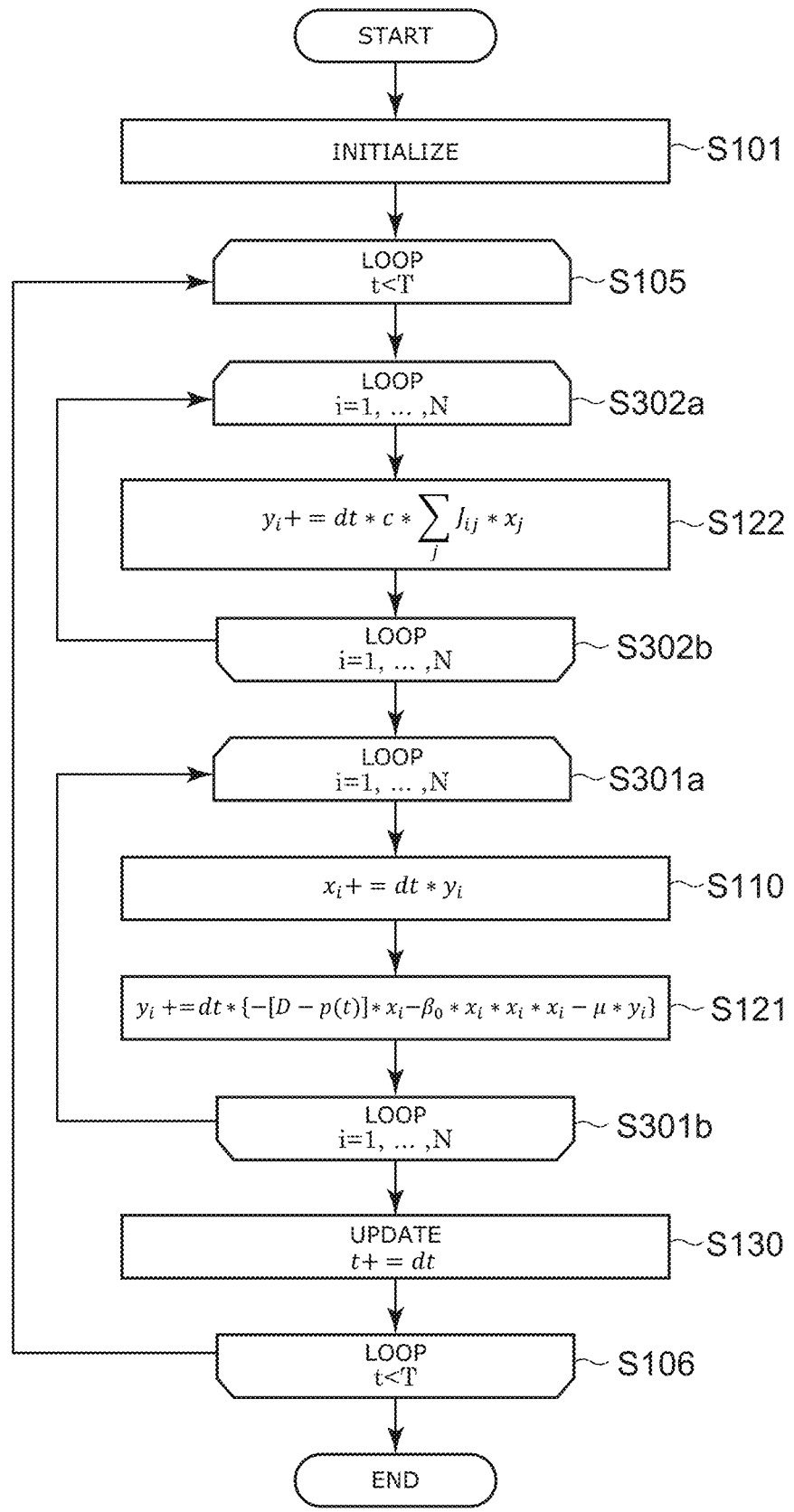
FIG. 13 is a flowchart illustrating an operation of the calculating device according to the embodiment.
Figure 14:
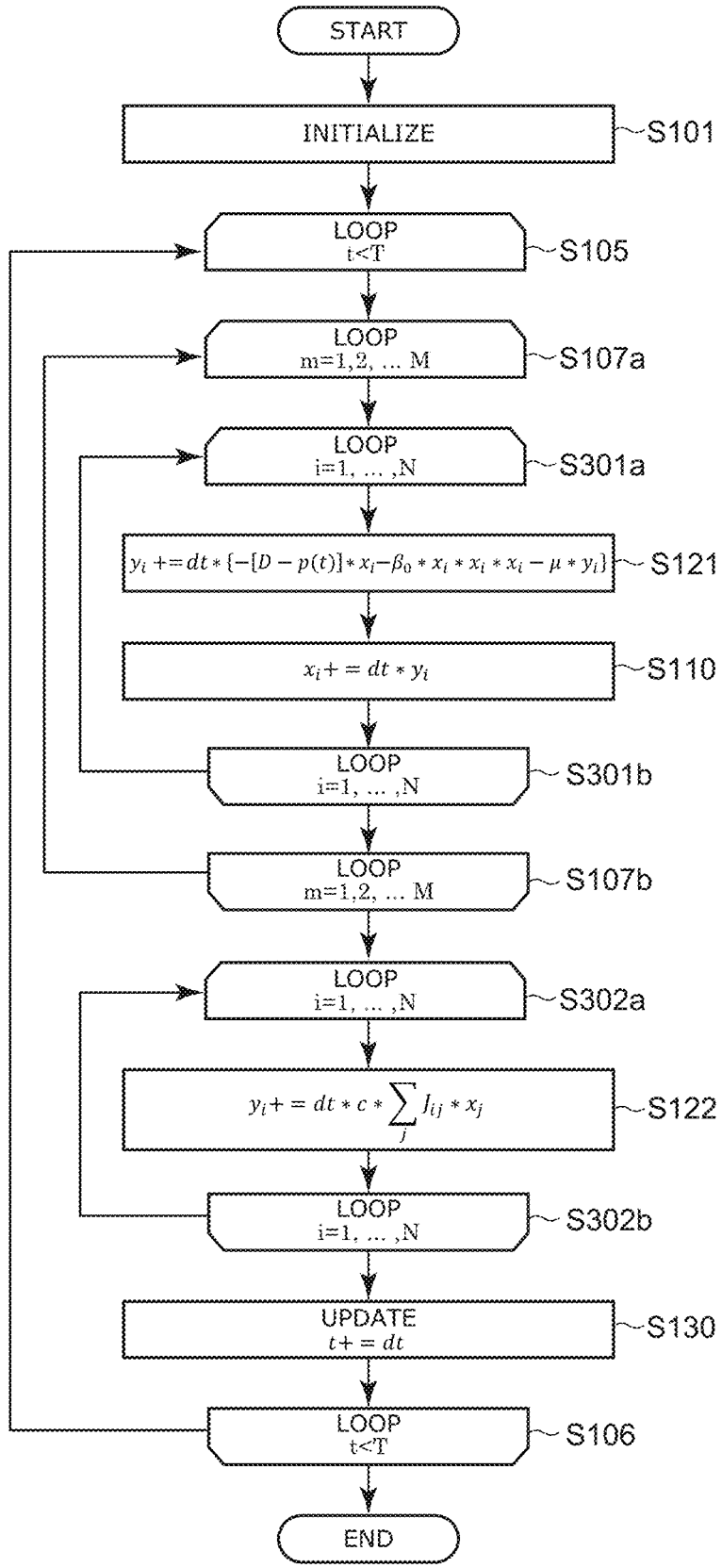
FIG. 14 is a flowchart illustrating an operation of the calculating device according to the embodiment.
Figure 15:
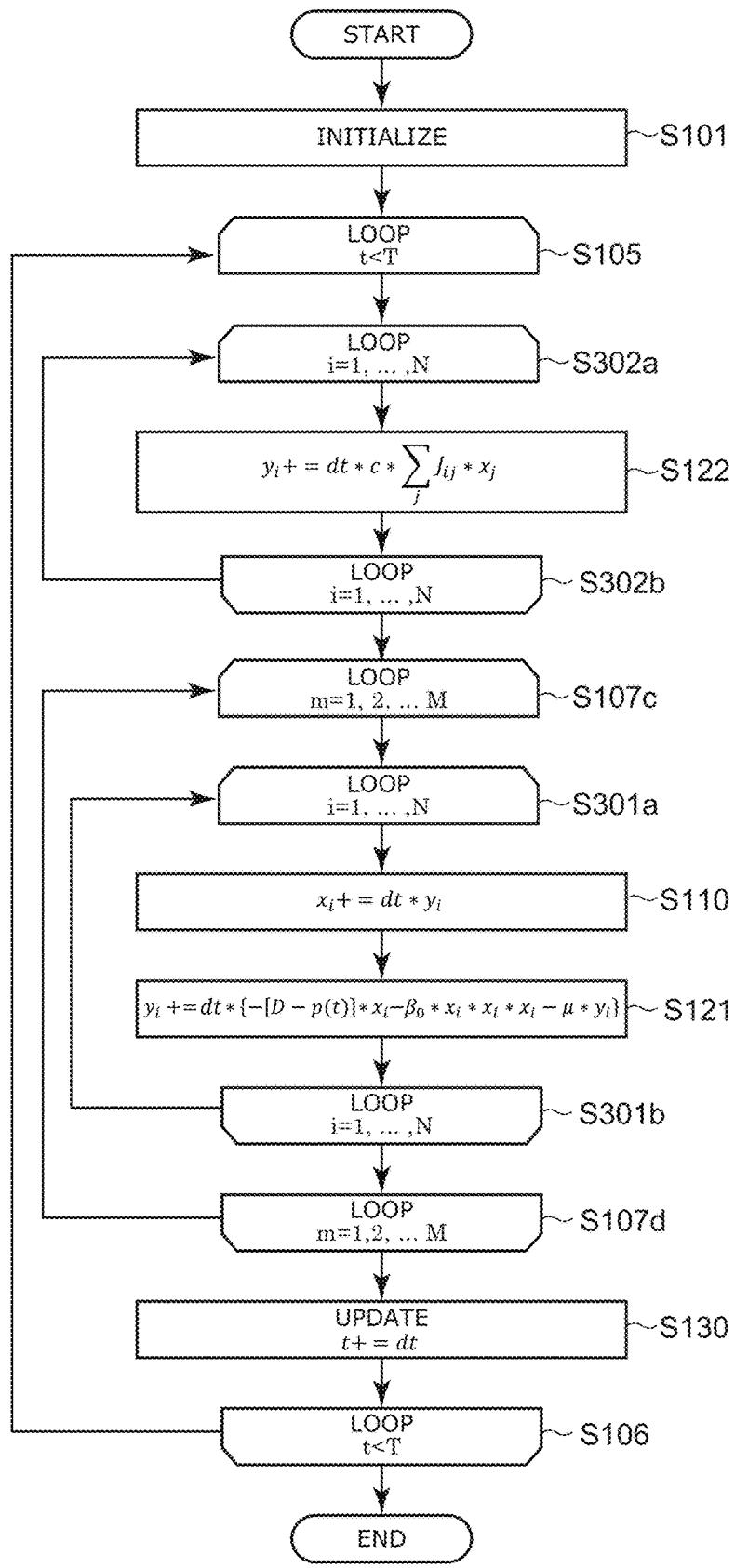
FIG. 15 is a flowchart illustrating an operation of the calculating device according to the embodiment.

As shown in FIG. 10 and FIG. 14, the processing of step S107a to step S107b is performed repeatedly M times. As shown in FIG. 11 and FIG. 15, the processing of step S107c to step S107d is performed repeatedly M times.

For example, the second sub-update may be performed after alternately performing the first variable update and the first sub-update M times (M being an integer of 1 or more) (referring to FIG. 10). The first variable update and the first sub-update may be performed alternately M times after the second sub-update (referring to FIG. 11).

Second Embodiment

A second embodiment includes a circuit in which the calculations described in reference to the first embodiment are possible. The circuit may include, for example, a parallel digital computer such as a dedicated circuit, etc. The dedicated circuit may include, for example, at least one of a FPGA, a gate array, or an ASIC.

Third Embodiment

A third embodiment relates to a calculation program. The calculation program causes a computer to acquire the data set {s}, repeat a processing procedure, and output the fourth function. The processing procedure includes the first variable update recited above and the second variable update recited above. The fourth function recited above is a function of the first variable set {x} and the second variable set {y} obtained after repeating the processing procedure. The processing described in reference to the first embodiment is applicable to the calculation program according to the embodiment.

Fourth Embodiment

A fourth embodiment is a computer-readable recording medium. A calculation program is recorded in the recording medium. The calculation program causes a computer to acquire the data set {s}, repeat a processing procedure, and output the fourth function. The processing procedure includes the first variable update recited above and the second variable update recited above. The fourth function recited above is a function of the first variable set {x} and the second variable set {y} obtained after repeating the processing procedure. The processing described in reference to the first embodiment is applicable to the recording medium according to the embodiment.

Fifth Embodiment

The embodiment relates to a calculation method. The calculation method acquires the data set {s}, repeats a processing procedure, and outputs the fourth function. The processing procedure includes the first variable update recited above and the second variable update recited above. The fourth function recited above is a function of the first variable set {x} and the second variable set {y} obtained after repeating the processing procedure. The processing described in reference to the first embodiment is performed by the calculation method according to the embodiment.

For example, the processing (the instructions) of the various information (the data) recited above is performed based on a program (software). For example, the processing of the various information recited above is performed by a computer storing the program and reading the program.

The processing of the various information recited above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another recording medium.

For example, the information that is recorded in the recording medium can be read by a computer (or an embedded system). The recording format (the storage format) of the recording medium is arbitrary. For example, the computer reads the program from the recording medium and causes a CPU to execute the instructions described in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium of the embodiments also includes a recording medium to which a program obtained using a LAN, the Internet, etc., is downloaded and stored. The processing recited above may be performed based on multiple recording media.

The computer according to the embodiments includes one or multiple devices (e.g., personal computers, etc.). The computer according to the embodiments may include multiple devices connected by a network.

The embodiments may include, for example, the following configurations (e.g., technological proposals).

Configuration 1

A calculating device, comprising a processor acquiring a data set $\{s\}$ and repeating a processing procedure, the processing procedure including a first variable update and a second variable update, the first variable update including updating an ith entry of a first variable $x_i$ by adding a first function to the ith entry of the first variable $x_i$ before the first variable update (I being an integer not less than 1 and not more than N, and N being an integer of 2 or more), the ith entry of the first variable $x_i$ being one of a first variable set $\{x\}$, a variable of the first function including at least a part of a second variable set $\{y\}$, the second variable update including updating an ith entry of a second variable $y_i$ by adding a second function and a third function to the ith entry of the second variable $y_i$ before the second variable update, the ith entry of the second variable $y_i$ being one of the second variable set $\{y\}$, a variable of the second function including the ith entry of first variable $x_i$ and at least a part of the data set $\{s\}$, a variable of the third function including at least a part of the first variable set $\{x\}$ and at least a part of the first parameter set $\{J\}$, the processor outputting at least a fourth function, a variable of the fourth function including at least a part of the first variable set $\{x\}$ obtained after repeating the processing procedure and the second variable set $\{y\}$ obtained after repeating the processing procedure.

Configuration 2

The calculating device according to Configuration 1, further comprising a storer, the storer being configured to store the data set $\{s\}$, the first variable set $\{x\}$, the second variable set $\{y\}$, and the first parameter set $\{J\}$, the processor being configured to acquire the data set $\{s\}$, the first variable set $\{x\}$, the second variable set $\{y\}$, and the first parameter set $\{J\}$ stored in the storer, the processor providing, to the storer, the first variable $x_i$ after the updating of the first variable update, the processor providing, to the storer, the second variable $y_i$ after the updating of the second variable update.

Configuration 3

The calculating device according to Configuration 1 or 2, wherein the data set $\{s\}$ includes a kth entry of data $s_k$ (k being an integer not less than 1 and not more than (S−1), and S being an integer of 2 or more), the second function includes at least one update parameter, and the update parameter changes according to the data $s_k$.

Configuration 4

The calculating device according to Configuration 1 or 2, wherein the data set $\{s\}$ includes a kth entry of data $s_k$ (k being an integer not less than 1 and not more than (S−1)) and a (k+1)th entry of data $s_{k+1}$, in the second variable update, the processor updates the second variable $y_i$ L times (L being an integer of 1 or more) using the second function including a first update parameter, and subsequently updates the second variable $y_i$ L times using the second function including a second update parameter, the first update parameter is based on the data $s_k$, and the second update parameter is based on the data $s_{k+1}$.

Configuration 5

The calculating device according to Configuration 4, wherein when the data $s_k$ is greater than a reference value, the update parameter increases and subsequently decreases during the L times of updating to reach, after the L times of updating, a value before the L times of updating, and when the data $s_k$ is less than the reference value, the update parameter decreases and subsequently increases during the L times of updating to reach, after the L times of updating, the value before the L times of updating.

Configuration 6

The calculating device according to Configuration 4, wherein when the data $s_k$ is greater than a reference value, the update parameter decreases and subsequently increases during the L times of updating to reach, after the L times of updating, a value before the L times of updating, and when the data $s_k$ is less than the reference value, the update parameter increases and subsequently decreases during the L times of updating to reach, after the L times of updating, the value before the L times of updating.

Configuration 7

The calculating device according to Configuration 4, wherein the processor is configured to output the fourth function after the L times of updating using the second function including the first update parameter, and configured to output the fourth function after the L times of updating using the second function including the second update parameter.

Configuration 8

The calculating device according to Configuration 7, wherein the processor is configured to output the fourth function V times (V being an integer not less than 1 and not more than L) during the L times of updating using the update parameter.

Configuration 9

The calculating device according to Configurations 3 to 8, wherein
the processor simultaneously performs at least:
at least a part of the second variable update using the first update parameter set based on the data $s_k$; and
at least a part of an input of an Ith entry of data $s_I$ (I being an integer larger than k and not more than (S−1)).

Configuration 10

The calculating device according to any one of Configurations 1 to 9, wherein the processor includes a plurality of calculators,
a part of the first variable update is performed by one of the plurality of calculators, and
an other part of the first variable update is performed by an other one of the plurality of calculators.

Configuration 11

The calculating device according to any one of Configurations 1 to 10, wherein
the second variable update includes a first sub-update and a second sub-update,
the first sub-update includes updating the ith entry of the second variable $y_i$ by adding the second function to the ith entry of the second variable $y_i$ before the first sub-update,
the second sub-update includes updating the ith entry of the second variable $y_i$ by adding the third function to the ith entry of the second variable $y_i$ before the second sub-update, and
the second sub-update is performed after performing the first variable update and the first sub-update alternately M times (M being an integer of 1 or more), or the first variable update and the first sub-update are performed alternately M times after the second sub-update.

Configuration 12

The calculating device according to any one of Configurations 1 to 11, wherein the processor is configured to output a calculation result set $\{z\}$ of a second parameter set $\{w\}$ and the first variable set $\{x\}$ after the updating.

Configuration 13

The calculating device according to any one of Configurations 1 to 12, wherein
the second function includes a term including at least a part of the second variable set $\{y\}$,
the term is 0 when the second variable $y_i$ is 0, and
a value of the second function decreases monotonously as the second variable $y_i$ increases.

Configuration 14

A calculation program causing a computer to acquire a data set $\{s\}$, repeat a processing procedure, and output a fourth function,
the processing procedure including a first variable update and a second variable update,
the first variable update including updating an ith entry of a first variable $x_i$ by adding a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the first function including at least a part of a second variable set $\{y\}$,
the second variable update including updating an ith entry of a second variable $y_i$ by adding a second function and a third function to the ith entry of the second variable $y_i$ before the second variable update, the ith entry of the second variable $y_i$ being one of the second variable set $\{y\}$, a variable of the second function including the ith entry of first variable $x_i$ and at least a part of the data set $\{s\}$, a variable of the third function including at least a part of the first variable set $\{x\}$ and at least a part of the first parameter set $\{J\}$,
a variable of the fourth function including at least a part of the first variable set $\{x\}$ obtained after repeating the processing procedure and the second variable set $\{y\}$ obtained after repeating the processing procedure.

Configuration 15

A recording medium, the recording medium being computer-readable, a calculation program being recorded in the recording medium, the calculation program causing a computer to acquire a data set $\{s\}$, repeat a processing procedure, and output a fourth function,
the processing procedure including a first variable update and a second variable update,
the first variable update including updating an ith entry of a first variable $x_i$ by adding a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the first function including at least a part of a second variable set $\{y\}$,
the second variable update including updating an ith entry of a second variable $y_i$ by adding a second function and a third function to the ith entry of the second variable $y_i$ before the second variable update, the ith entry of the second variable $y_i$ being one of the second variable set $\{y\}$, a variable of the second function including the ith entry of first variable $x_i$ and at least a part of the data set $\{s\}$, a variable of the third function including at least a part of the first variable set $\{x\}$ and at least a part of the first parameter set $\{J\}$,
a variable of the fourth function including at least a part of the first variable set $\{x\}$ obtained after repeating the processing procedure and the second variable set $\{y\}$ obtained after repeating the processing procedure.

Configuration 16

A calculation method, comprising:
acquiring a data set $\{s\}$;
repeating a processing procedure; and
outputting a fourth function,
the processing procedure including a first variable update and a second variable update,
the first variable update including updating an ith entry of a first variable $x_i$ by adding a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the first function including at least a part of a second variable set $\{y\}$,
the second variable update including updating an ith entry of a second variable $y_i$ by adding a second function and a third function to the ith entry of the second variable $y_i$ before the second variable update, the ith entry of the second variable $y_i$ being one of the second variable set $\{y\}$, a variable of the second function including the ith entry of first variable $x_i$ and at least a part of the data set $\{s\}$, a variable of the third function including at least a part of the first variable set $\{x\}$ and at least a part of the first parameter set $\{J\}$,
a variable of the fourth function including at least a part of the first variable set $\{x\}$ obtained after repeating the processing procedure and the second variable set {y} obtained after repeating the processing procedure.

According to the embodiments, a calculating device, a calculation program, a recording medium, and a calculation method having higher computing power can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculation devices such as processors, acquirers, outputters, storers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculation devices, calculation programs, calculation media, and calculation methods practicable by an appropriate design modification by one skilled in the art based on the calculation devices, the calculation programs, the calculation media, and the calculation methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising a processor and a plurality of parallel computing devices, wherein the processor is configured to at least acquire a data set {s} for training a recurrent neural network, repeat a processing procedure for modifying parameters of the recurrent neural network, and output a fourth function, wherein a parameter function corresponding to the data set {s} has a temporal change inducing a time evolution for a nonlinear oscillator;

wherein the processing procedure includes: a first variable update and a second variable update, modifying an ith entry of a first variable $x_i$ by combining a first function to the ith entry of the first variable $x_i$ (i being an integer not less than 1 and not more than N, and N being an integer of 2 or more), the ith entry of the first variable $x_i$ being one of a first variable set {x} reflecting a measured value of the nonlinear oscillator at time $t_{xi}$, a variable of the first function including at least a part of a second variable set {y}, and modifying an ith entry of a second variable $y_i$ by combining a second function and a third function to the ith entry of the second variable $y_i$, the ith entry of the second variable $y_i$ being one of the second variable set {y} reflecting the measured value of the nonlinear oscillator at time $t_{yi}$, a variable of the second function including the ith entry of first variable $x_i$ and at least a part of the data set {s}, a variable of the third function including at least a part of the first variable set {x} and at least a part of the first parameter set {J}, wherein modifying the ith entry of the first variable $x_i$ and modifying the ith entry of the second variable $y_i$ are performed in parallel by assigning portions of the processing procedure to the plurality of parallel computing devices for computation, the processor being further configured to combine outcomes of the assigned portions of the processing procedure from the plurality of parallel computing devices;

wherein the processor is configured to output at least the fourth function, a variable of the fourth function including at least a part of the first variable set {x} obtained after repeating the processing procedure and the second variable set {y} obtained after repeating the processing procedure; and wherein the parameters of the recurrent neural network are modified so that the fourth function approaches target values.

2. The device according to claim 1, further comprising a storer, the storer being configured to store the data set {s}, the first variable set {x}, the second variable set {y}, and the first parameter set {J}, the processor being configured to acquire the data set {s}, the first variable set {x}, the second variable set {y}, and the first parameter set {J} stored in the storer, the processor providing, to the storer, the first variable $x_i$ after modifying the ith entry of the first variable $x_i$, the processor providing, to the storer, the second variable $y_i$ after modifying the ith entry of the second variable $y_i$.

3. The device according to claim 1, wherein the data set {s} includes a kth entry of data $s_k$ (k being an integer not less than 1 and not more than (S−1), and S being an integer of 2 or more), the second function includes at least one update parameter, and the update parameter changes according to the data $s_k$.

4. The device according to claim 1, wherein the data set {s} includes a kth entry of data $s_k$ (k being an integer not less than 1 and not more than (S−1)) and a (k+1)th entry of data $s_{k+1}$, modifying the ith entry of the second variable $y_i$ comprises updating the second variable $y_i$ L times (L being an integer of 1 or more) using the second function including a first update parameter, and subsequently updating the second variable $y_i$ L times using the second function including a second update parameter, the first update parameter is based on the data $s_k$, and the second update parameter is based on the data $s_{k+1}$.

5. The device according to claim 4, wherein when the data $s_k$ is greater than a reference value, the update parameter increases and subsequently decreases during the L times of updating to reach, after the L times of updating, a value before the L times of updating, and when the data $s_k$ is less than the reference value, the update parameter decreases and subsequently increases during the L times of updating to reach, after the L times of updating, the value before the L times of updating.

6. The device according to claim 4, wherein
when the data $s_k$ is greater than a reference value, the update parameter decreases and subsequently increases during the L times of updating to reach, after the L times of updating, a value before the L times of updating, and
when the data $s_k$ is less than the reference value, the update parameter increases and subsequently decreases during the L times of updating to reach, after the L times of updating, the value before the L times of updating.

7. The device according to claim 4, wherein the processor is configured to output the fourth function after the L times of updating using the second function including the first update parameter, and configured to output the fourth function after the L times of updating using the second function including the second update parameter.

8. The device according to claim 7, wherein the processor is configured to output the fourth function V times (V being an integer not less than 1 and not more than L) during the L times of updating using the update parameter.

9. The device according to claim 3, wherein
modifying the ith entry of the second variable $y_i$ comprises using the first update parameter set based on the data $s_k$; and
at least a part of an input of an ith entry of data $s_I$ (I being an integer larger than k and not more than (S-1)).

10. The device according to claim 1, wherein the processor includes a plurality of calculators, wherein
a part of modifying the ith entry of the first variable $x_i$ is performed by one of the plurality of calculators, and
an other part of modifying the ith entry of the first variable $x_i$ is performed by an other one of the plurality of calculators.

11. The device according to claim 1,
wherein modifying the ith entry of the second variable $y_i$ includes:
updating the ith entry of the second variable $y_i$ by adding the second function to the ith entry of the second variable $y_i$, and
updating the ith entry of the second variable $y_i$ by adding the third function to the ith entry of the second variable $y_i$, and
wherein updating the ith entry of the second variable $y_i$ by adding the third function to the ith entry of the second variable $y_i$ is performed after:
modifying the ith entry of the first variable $x_i$ and updating the ith entry of the second variable $y_i$ by adding the second function to the ith entry of the second variable $y_i$ alternately M times (M being an integer of 1 or more), or
modifying the ith entry of the first variable $x_i$ and updating the ith entry of the second variable $y_i$ by adding the second function to the ith entry of the second variable $y_i$ alternately M times after updating the ith entry of the second variable $y_i$ by adding the third function to the ith entry of the second variable $y_i$.

12. The device according to claim 1, wherein the processor is configured to output a calculation result set $\{z\}$ of a second parameter set $\{w\}$ and the first variable set $\{x\}$ after modifying the ith entry of the first variable $x_i$ or modifying the ith entry of the second variable $y_i$.

13. The device according to claim 1, wherein
the second function includes a term including at least a part of the second variable set $\{y\}$,
the term is 0 when the second variable $y_i$ is 0, and
a value of the second function decreases monotonously as the second variable $y_i$ increases.

14. A non-transitory computer-readable storage medium storing instructions which, when executed, configure a processor to at least acquire a data set $\{s\}$ for training a recurrent neural network, repeat a processing procedure for modifying parameters of the recurrent neural network, and output a fourth function,
wherein a parameter function corresponding to the data set $\{s\}$ has a temporal change inducing a time evolution for a nonlinear oscillator;
wherein the processing procedure includes:
modifying an ith entry of a first variable $x_i$ by combining a first function to the ith entry of the first variable $x_i$ (i being an integer not less than 1 and not more than N, and N being an integer of 2 or more), the ith entry of the first variable $x_i$ being one of a first variable set $\{x\}$ reflecting a measured value of the nonlinear oscillator at time $t_{xi}$, a variable of the first function including at least a part of a second variable set $\{y\}$, and
modifying an ith entry of a second variable $y_i$ by combining a second function and a third function to the ith entry of the second variable $y_i$, the ith entry of the second variable $y_i$ being one of the second variable set $\{y\}$ reflecting the measured value of the nonlinear oscillator at time $t_{yi}$, a variable of the second function including the ith entry of first variable xi and at least a part of the data set $\{s\}$, a variable of the third function including at least a part of the first variable set $\{x\}$ and at least a part of the first parameter set $\{J\}$,
wherein modifying the ith entry of the first variable $x_i$ and modifying the ith entry of the second variable $y_i$ are performed in parallel by assigning portions of the processing procedure to a plurality of parallel computing devices for computation and combining outcomes of the assigned portions of the processing procedure from the plurality of parallel computing devices;
wherein a variable of the fourth function includes at least a part of the first variable set $\{x\}$ obtained after repeating the processing procedure and the second variable set $\{y\}$ obtained after repeating the processing procedure; and
wherein the parameters of the recurrent neural network are modified so that the fourth function approaches target values.

15. A calculation method, comprising:
acquiring a data set $\{s\}$ for training a recurrent neural network;
repeating a processing procedure for modifying parameters of the recurrent neural network; and
outputting a fourth function,
wherein a parameter function corresponding to the data set $\{s\}$ has a temporal change inducing a time evolution for a nonlinear oscillator;
wherein the processing procedure includes:
modifying an ith entry of a first variable $x_i$ by combining a first function to the ith entry of the first variable $x_i$ (i being an integer not less than 1 and not more than N, and N being an integer of 2 or more), the ith entry of the first variable $x_i$ being one of a first variable set $\{x\}$ reflecting a measured value of the nonlinear oscillator at time $t_{xi}$, a variable of the first function including at least a part of a second variable set {y}, modifying an ith entry of a second variable $y_i$ by combining a second function and a third function to the ith entry of the second variable $y_i$, the ith entry of the second variable $y_i$ being one of the second variable set {y} reflecting the measured value of the nonlinear oscillator at time $t_{yi}$, a variable of the second function including the ith entry of first variable xi and at least a part of the data set {s}, a variable of the third function including at least a part of the first variable set {x} and at least a part of the first parameter set {J}, wherein modifying the ith entry of the first variable xi and modifying the ith entry of the second variable $y_i$ are performed in parallel by assigning portions of the processing procedure to a plurality of parallel computing devices for computation and combining outcomes of the assigned portions of the processing procedure from the plurality of parallel computing devices;

wherein a variable of the fourth function includes at least a part of the first variable set {x} obtained after repeating the processing procedure and the second variable set {y} obtained after repeating the processing procedure; and wherein the parameters of the recurrent neural network are modified so that the fourth function approaches target values.

* * * * *